US012785916B2

(12) United States Patent
Saggar et al.

(10) Patent No.: US 12,785,916 B2
(45) Date of Patent: Nov. 3, 2026

(54) MULTI-PART DYNAMIC CAPABILITY SIGNALING FOR FULL-DUPLEX COMMUNICATIONS

(71) Applicant: QUALCOMM Incorporated, San Diego, CA (US)

(72) Inventors: Hemant Saggar, San Diego, CA (US); Yan Zhou, San Diego, CA (US); Jelena Damnjanovic, Del Mar, CA (US); Junyi Li, Fairless Hills, PA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 18/172,839

(22) Filed: Feb. 22, 2023

(65) Prior Publication Data

US 2024/0283624 A1 Aug. 22, 2024

(51) Int. Cl.
*H04L 5/14* (2006.01)
*H04W 72/51* (2023.01)

(52) U.S. Cl.
CPC ............... *H04L 5/14* (2013.01); *H04W 72/51* (2023.01)

(58) Field of Classification Search
CPC ................................ H04L 5/14; H04W 72/51
See application file for complete search history.

(56) References Cited

U.S. PATENT DOCUMENTS

| | | | | |
|---|---|---|---|---|
| 8,149,743 B1 * | 4/2012 | Choksi | H04L 5/14 | 370/296 |
| 8,462,671 B2 * | 6/2013 | Rinne | H04B 1/56 | 370/278 |
| 2007/0054625 A1 * | 3/2007 | Beale | H04W 72/542 | 455/69 |
| 2008/0153431 A1 * | 6/2008 | Haartsen | H04B 1/48 | 455/78 |
| 2013/0229952 A1 * | 9/2013 | Koskinen | H04L 1/0025 | 370/278 |
| 2014/0169232 A1 * | 6/2014 | Aggarwal | H04L 5/14 | 370/277 |

(Continued)

OTHER PUBLICATIONS

R1-220xxxx (Year: 2022).*

*Primary Examiner* — Kevin C. Harper
*Assistant Examiner* — Guoxing Fan
(74) *Attorney, Agent, or Firm* — Holland & Hart LLP

(57) ABSTRACT

Methods, systems, and devices for wireless communications are described. In some wireless communication systems, a first network node may transmit, prior to being radio resource control (RRC)-connected with a second network node, a first message indicating a first capability of the first network node to support full-duplex communications. After transmitting the first message and while RRC-connected with the second network node (and before, during, or after exchanging data with the second network node), the first network node may transmit one or more second messages indicating a second capability of the first network node to support full-duplex communications. The second capability may update or change the first capability indicated via the first message. The first network node and the second network node may communicate in accordance with the second capability indicated in one of the second messages.

28 Claims, 15 Drawing Sheets

(56) References Cited

U.S. PATENT DOCUMENTS

| | | | | |
|---|---|---|---|---|
| 2015/0071062 | A1* | 3/2015 | Cheng | H04W 52/42 370/230 |
| 2016/0127108 | A1* | 5/2016 | Jindal | H04W 72/0453 370/281 |
| 2017/0054544 | A1* | 2/2017 | Kazmi | H04L 5/14 |
| 2017/0257184 | A1* | 9/2017 | Stirling-Gallacher | H04L 1/0026 |
| 2018/0026777 | A1* | 1/2018 | Su | H04L 5/16 370/252 |
| 2018/0091283 | A1* | 3/2018 | Wang | H04L 5/1461 |
| 2018/0098291 | A1* | 4/2018 | Fodor | H04W 52/346 |
| 2018/0167832 | A1* | 6/2018 | Fang | H04W 24/08 |
| 2018/0212746 | A1* | 7/2018 | Kazmi | H04L 5/14 |
| 2019/0097707 | A1* | 3/2019 | Cox | H04B 1/005 |
| 2020/0359428 | A1* | 11/2020 | Pan | H04W 28/0268 |
| 2020/0396599 | A1* | 12/2020 | Luo | H04L 5/16 |
| 2021/0021399 | A1* | 1/2021 | Liu | H04L 1/0003 |
| 2022/0182160 | A1* | 6/2022 | Su | H04B 17/309 |
| 2023/0014303 | A1* | 1/2023 | Di Girolamo | H04W 72/20 |
| 2023/0057994 | A1* | 2/2023 | Elkotby | H02J 50/001 |
| 2023/0073130 | A1* | 3/2023 | He | H04L 5/0044 |
| 2023/0309126 | A1* | 9/2023 | Suh | H04L 5/0053 |
| 2023/0328510 | A1* | 10/2023 | Shin | H04B 17/14 370/329 |
| 2023/0413187 | A1* | 12/2023 | Hassan | H04W 52/243 |
| 2024/0015546 | A1* | 1/2024 | Awadin | H04W 24/10 |
| 2024/0073930 | A1* | 2/2024 | Khoryaev | H04W 72/20 |
| 2024/0089763 | A1* | 3/2024 | Wu | H04W 72/54 |
| 2024/0267895 | A1* | 8/2024 | Kim | H04L 5/0094 |
| 2024/0381330 | A1* | 11/2024 | Gou | H04W 72/23 |
| 2025/0063628 | A1* | 2/2025 | Back | H04W 72/25 |

* cited by examiner

MULTI-PART DYNAMIC CAPABILITY SIGNALING FOR FULL-DUPLEX COMMUNICATIONS

INTRODUCTION

The following relates to wireless communications relating to multi-part dynamic capability signaling for full-duplex communications. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be a user equipment (UE).

SUMMARY

The described techniques relate to improved methods, systems, devices, and apparatuses that support multi-part dynamic capability signaling for full-duplex communications. For example, the described techniques provide that a first network node may transmit, prior to being radio resource control (RRC)-connected with a second network node, a first message indicating a first capability of the first network node to support full-duplex communications. After transmitting the first message and while RRC-connected with the second network node (and before, during, or after exchanging data with the second network node), the first network node may transmit one or more second messages indicating a second capability of the first network node to support full-duplex communications. The second capability may update or change the first capability indicated via the first message. Following, the first network node and the second network node may communicate in accordance with the second capability indicated in one of the second messages.

A method of wireless communication at a first network node is described. The method may include transmitting, prior to being radio resource control (RRC)-connected with a second network node, a first message that indicates a first capability of the first network node to support full-duplex communications, transmitting, after the first message and while the first network node and the second network node are RRC connected, one or more second messages that indicates a second capability of the first network node to support the full-duplex communications, where the second capability is an update to the first capability, and communicating with the second network node in accordance with the second capability indicated in a second message of the one or more second messages.

An apparatus for wireless communication at a first network node is described. The apparatus may include a memory, and at least one processor coupled to the memory. The at least one processor may be configured to transmit, prior to being RRC-connected with a second network node, a first message that indicates a first capability of the first network node to support full-duplex communications, transmit, after the first message and while the first network node and the second network node are RRC-connected, one or more second messages that indicates a second capability of the first network node to support the full-duplex communications, where the second capability is an update to the first capability, and communicate with the second network node in accordance with the second capability indicated in a second message of the one or more second messages.

Another apparatus for wireless communication at a first network node is described. The apparatus may include means for transmitting, prior to being RRC-connected with a second network node, a first message that indicates a first capability of the first network node to support full-duplex communications, means for transmitting, after the first message and while the first network node and the second network node are RRC-connected, one or more second messages that indicates a second capability of the first network node to support the full-duplex communications, where the second capability is an update to the first capability, and means for communicating with the second network node in accordance with the second capability indicated in a second message of the one or more second messages.

A non-transitory computer-readable medium at a first network node is described. The non-transitory computer-readable medium may have code for wireless communication stored thereon that, when executed by the first network node, causes the network node to transmit, prior to being RRC-connected with a second network node, a first message that indicates a first capability of the first network node to support full-duplex communications, transmit, after the first message and while the first network node and the second network node are RRC-connected, one or more second messages that indicates a second capability of the first network node to support the full-duplex communications, where the second capability is an update to the first capability, and communicate with the second network node in accordance with the second capability indicated in a second message of the one or more second messages.

Some examples of the method, apparatuses, and non-transitory computer-readable medium described herein may further include operations, features, means, or instructions for receiving a third message that indicates a third capability of the second network node to support the full-duplex communications and transmitting, after the third message and while the first network node and the second network node may be RRC-connected, the second message that indicates the second capability of the first network node, where the second capability may be based on the third capability.

In some examples of the method, apparatuses, and non-transitory computer-readable medium described herein, transmitting the first message may include operations, features, means, or instructions for transmitting, via the first message, a fixed quantity of bits that indicates the first capability of the first network node.

Some examples of the method, apparatuses, and non-transitory computer-readable medium described herein may further include operations, features, means, or instructions for communicate with the second network node in accordance with the first capability indicated in the first message, transmitting a control message that indicates a power level of the first network node or a processing load of the first network node, and initiate a modification procedure or a tear-down procedure for the full-duplex communications based on the control message indicating that the power level of the first network node may be less than a power level threshold or the processing load of the first network node may be greater than a processing load threshold.

In some examples of the method, apparatuses, and non-transitory computer-readable medium described herein, the second capability may be a same as or may be supplementary to the first capability of the first network node to support the full-duplex communications.

In some examples of the method, apparatuses, and non-transitory computer-readable medium described herein, the second capability indicates that the first network node no longer supports the full-duplex communications.

In some examples of the method, apparatuses, and non-transitory computer-readable medium described herein, the second message includes an indication of a set of full-duplex parameters associated with the first capability of the first network node to support the full-duplex communications.

In some examples of the method, apparatuses, and non-transitory computer-readable medium described herein, the set of full-duplex parameters include one or more of a type of the first network node, one or more types of full-duplex communications modes supported by the first network node, a maximum power of the first network node in a full-duplex communications mode, one or more types of channels supported by the first network node in the full-duplex communications mode, a quantity of transmission layers per direction supported by the first network node in the full-duplex communications mode, a quantity of transmission configuration indicator (TCI) states per direction supported by the first network node in the full-duplex communications mode, or a length of time for which the first capability and the set of full-duplex parameters may be considered valid.

In some examples of the method, apparatuses, and non-transitory computer-readable medium described herein, transmitting the second message may include operations, features, means, or instructions for transmitting a quantity of bits that indicates the set of full-duplex parameters, where the quantity of bits may be based on the second capability.

Some examples of the method, apparatuses, and non-transitory computer-readable medium described herein may further include operations, features, means, or instructions for receiving the second message in response to successfully being RRC-connected with the second network node.

Some examples of the method, apparatuses, and non-transitory computer-readable medium described herein may further include operations, features, means, or instructions for receiving a request to update the first capability, where the second message may be transmitted based on receiving the request.

In some examples of the method, apparatuses, and non-transitory computer-readable medium described herein, the second message may be transmitted prior to, during, or after an exchange of data with the second network node while the first network node and the second network node may be RRC-connected.

Some examples of the method, apparatuses, and non-transitory computer-readable medium described herein may further include operations, features, means, or instructions for transmitting, prior to being RRC-connected with the second network node, the first message indicating the first capability as a first part of a multi-part capability message and transmitting, after being RRC-connected with the second network node, the second message indicating the second capability as part of a second part of a multi-part capability message.

In some examples of the method, apparatuses, and non-transitory computer-readable medium described herein, the first message may be a broadcast message, a multicast message, a groupcast message, or a unicast message, and where and the second message may be a groupcast message or a unicast message.

A method for wireless communication at a first network node is described. The method may include receiving, prior to being RRC-connected with a second network node, a first message that indicates a first capability of the second network node to support full-duplex communications, receiving, after the first message and while the first network node and the second network node are RRC-connected, one or more second messages that indicates a second capability of the second network node to support the full-duplex communications, where the second capability is an update to the first capability, and communicating with the second network node in accordance with the second capability indicated in a second message of the one or more second messages.

An apparatus for wireless communication at a first network node is described. The apparatus may include a memory, and at least one processor coupled to the memory. The at least one processor may be configured to receive, prior to being RRC-connected with a second network node, a first message that indicates a first capability of the second network node to support full-duplex communications, receive, after the first message and while the first network node and the second network node are RRC-connected, one or more second messages that indicates a second capability of the second network node to support the full-duplex communications, where the second capability is an update to the first capability, and communicate with the second network node in accordance with the second capability indicated in a second message of the one or more second messages.

Another apparatus for wireless communication at a first network node is described. The apparatus may include means for receiving, prior to being RRC-connected with a second network node, a first message that indicates a first capability of the second network node to support full-duplex communications, means for receiving, after the first message and while the first network node and the second network node are RRC-connected, one or more second messages that indicates a second capability of the second network node to support the full-duplex communications, where the second capability is an update to the first capability, and means for communicating with the second network node in accordance with the second capability indicated in a second message of the one or more second messages.

A non-transitory computer-readable medium at a first network node is described. The non-transitory computer-readable medium may have code for wireless communication stored thereon that, when executed by the first network node, causes the network node to receive, prior to being RRC-connected with a second network node, a first message that indicates a first capability of the second network node to support full-duplex communications, receive, after the first message and while the first network node and the second network node are RRC-connected, one or more second messages that indicates a second capability of the second network node to support the full-duplex communications, where the second capability is an update to the first capability, and communicate with the second network node in accordance with the second capability indicated in a second message of the one or more second messages.

Some examples of the method, apparatuses, and non-transitory computer-readable medium described herein may further include operations, features, means, or instructions for transmitting a third message that indicates a third capability of the first network node to support the full-duplex communications and receiving, after the third message and while the first network node and the second network node may be RRC-connected, the second message that indicates the second capability of the second network node, where the second capability may be based on the third capability.

In some examples of the method, apparatuses, and non-transitory computer-readable medium described herein, transmitting the first message may include operations, features, means, or instructions for receiving, via the first message, a fixed quantity of bits that indicates the first capability of the second network node.

Some examples of the method, apparatuses, and non-transitory computer-readable medium described herein may further include operations, features, means, or instructions for communicate with the second network node in accordance with the first capability indicated in the first message, receiving a control message that indicates a power level of the second network node or a processing load of the second network node, and perform a modification procedure or a tear-down procedure for the full-duplex communications based on the control message indicating that the power level of the second network node may be less than a power level threshold or the processing load of the second network node may be greater than a processing load threshold.

In some examples of the method, apparatuses, and non-transitory computer-readable medium described herein, the second capability may be a same as or may be supplementary to the first capability of the second network node to support the full-duplex communications.

In some examples of the method, apparatuses, and non-transitory computer-readable medium described herein, the second capability indicates that the second network node no longer supports the full-duplex communications.

In some examples of the method, apparatuses, and non-transitory computer-readable medium described herein, the second message includes an indication of a set of full-duplex parameters associated with the first capability of the second network node to support the full-duplex communications.

In some examples of the method, apparatuses, and non-transitory computer-readable medium described herein, the set of full-duplex parameters include one or more of a type of the first network node, one or more types of full-duplex communications modes supported by the first network node, a maximum power of the first network node in a full-duplex communications mode, one or more types of channels supported by the first network node in the full-duplex communications mode, a quantity of transmission layers per direction supported by the first network node in the full-duplex communications mode, a quantity of TCI states per direction supported by the first network node in the full-duplex communications mode, or a length of time for which the first capability and the set of full-duplex parameters may be considered valid.

In some examples of the method, apparatuses, and non-transitory computer-readable medium described herein, receiving the second message may include operations, features, means, or instructions for receiving a quantity of bits that indicates the set of full-duplex parameters, where the quantity of bits may be based on the second capability.

In some examples of the method, apparatuses, and non-transitory computer-readable medium described herein, receiving the second message may include operations, features, means, or instructions for receiving the second message in response to successfully being RRC-connected with the second network node.

Some examples of the method, apparatuses, and non-transitory computer-readable medium described herein may further include operations, features, means, or instructions for transmitting a request to update the first capability, where the second message may be received based on transmitting the request.

In some examples of the method, apparatuses, and non-transitory computer-readable medium described herein, the second message may be received prior to, during, or after an exchange of data with the second network node while the first network node and the second network node may be RRC-connected.

Some examples of the method, apparatuses, and non-transitory computer-readable medium described herein may further include operations, features, means, or instructions for receiving, prior to being RRC-connected with the second network node, the first message indicating the first capability as a first part of a multi-part capability message and receiving, after being RRC-connected with the second network node, the second message indicating the second capability as part of a second part of a multi-part capability message.

In some examples of the method, apparatuses, and non-transitory computer-readable medium described herein, the first message may be a broadcast message, a multicast message, a groupcast message, or a unicast message, and where and the second message may be a groupcast message or a unicast message.

DETAILED DESCRIPTION

Figure 1:
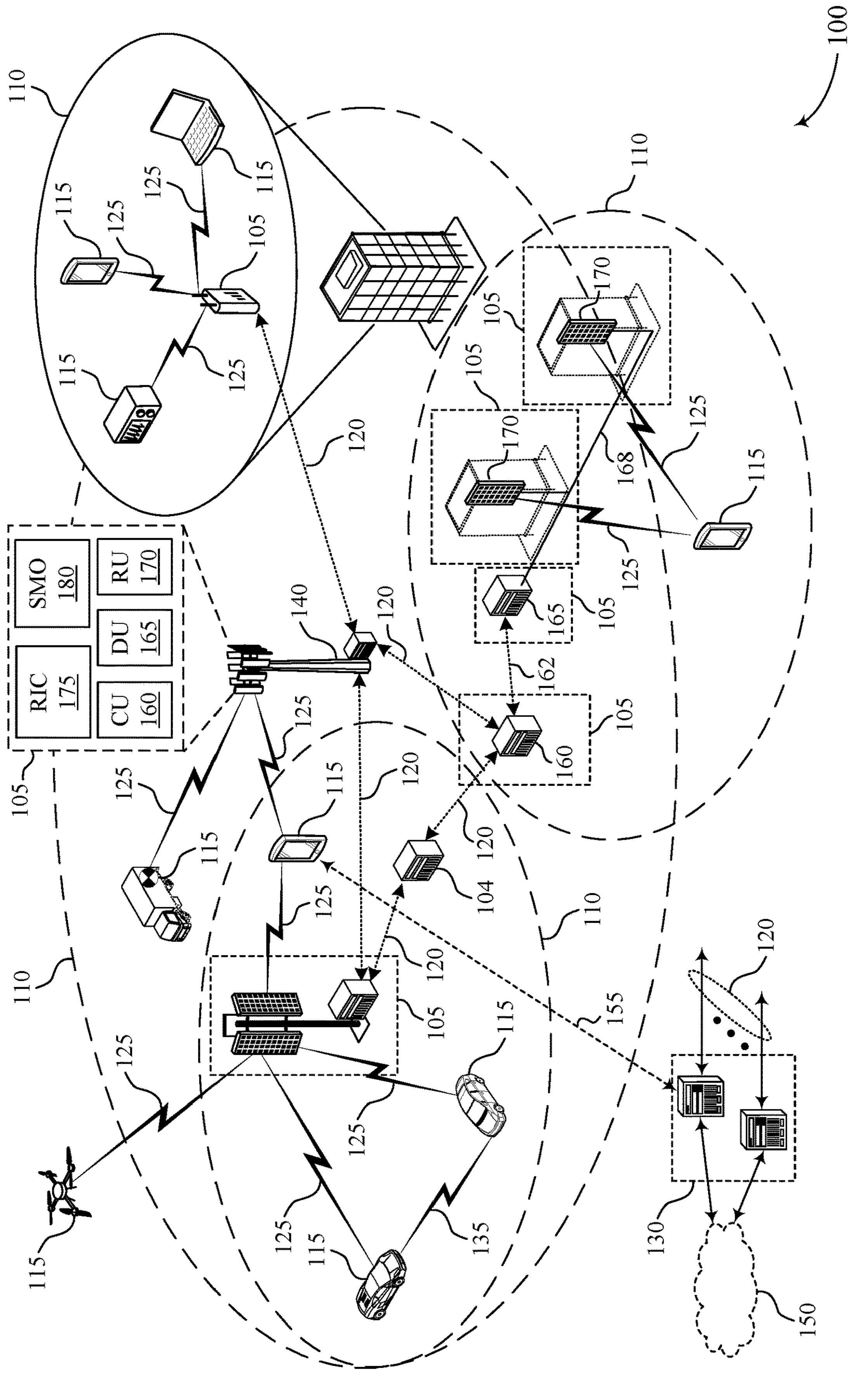
FIG. 1 illustrates an example of a wireless communications system that supports multi-part dynamic capability signaling for full-duplex communications in accordance with one or more aspects of the present disclosure.

In some wireless systems, two network nodes (e.g., user equipments (UEs) or network entities) may communicate with each other using half-duplex or full-duplex communications modes. If the network nodes support a full-duplex communications mode, the network nodes may simultaneously perform uplink and downlink communications. Alternatively, if the network nodes support a half-duplex communications mode, a network node may perform uplink or downlink communications at a given time. In some cases, a first network node may statically indicate a full-duplex capability when connecting with a second network node (e.g., during a radio resource control (RRC) connection procedure). If the first network node indicates that it is capable of full-duplex operation prior to the connection, then the second network node may expect that the first network node may be capable of performing full-duplex communications as long as the first network node is connected with the second network node.

In some cases, however, the full-duplex capability of the first network node may change while connected with the second network node. For example, the first network node may enter a power savings mode, the first network node may experience a shortage of computational resources available to use for full-duplex communications, or the first network node may experience a significant increase in self-interference in full-duplex communications. Self-interference may occur when transmissions and receptions of signals to and from the first network node interfere with each other. Thus, to change its full-duplex capability, the first network node may disconnect from the second network node, indicate the changed or updated full-duplex capability, and then reconnect in accordance with the changed or updated full-duplex capability. However, such processes may increase communication delays, reduce resource utilization efficiency, and reduce the reliability of communications between the first network node and the second network node.

Techniques of the present disclosure support dynamically transmitting a multi-part, full-duplex capability message for full-duplex communications. For example, a first network node (e.g., a UE) may indicate a full-duplex capability in a first message (a first part of the multi-part capability message) prior to connecting with a second network node (e.g., a UE, a network entity). After connecting with the second network node and before, during, or after exchanging data with the second network node, the first network node may transmit a second message (a second part of the multi-part capability message) updating the full-duplex capability of the first network node indicated in the first message. In some cases, the second message may indicate a change in the full-duplex capability (e.g., indicating the first network node is no longer capable of full-duplex communications), or the second message may reaffirm the full-duplex capability and, in some cases, indicate a set of additional parameters associated with the full-duplex capability (e.g., indicating a minimum size of a guard band between the transmit and receive bands for the full-duplex communications). As such, the multi-part capability message may enable the first network node to dynamically indicate a full-duplex capability without disconnecting from the second network node, which may result in increased power savings, decreased latency and delay, and an overall improvement in communications.

Aspects of the disclosure are initially described in the context of wireless communications systems. Additional aspects of the disclosure are described with reference to a wireless communications system and process flows. Aspects of the disclosure are further illustrated by and described with reference to apparatus diagrams, system diagrams, and flowcharts that relate to multi-part dynamic capability signaling for full-duplex communications.

FIG. 1 illustrates an example of a wireless communications system 100 that supports multi-part dynamic capability signaling for full-duplex communications in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multi-part dynamic capability signaling for full-duplex communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, In some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, In some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also referred to as the centimeter band, or using an extremely high frequency (EHF) region of the spectrum (e.g., from 30 GHz to 300 GHz), also referred to as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

In some aspects of the wireless communications system 100, two network nodes (e.g., UEs 115 or network entities 105) may communicate with each other using half-duplex or full-duplex communications modes. If the network nodes support a full-duplex communications mode, the network nodes may simultaneously perform uplink and downlink communications. Alternatively, if the network nodes support a half-duplex communications mode, a network node may perform uplink or downlink communications at a given time. In some cases, a first network node may statically indicate a full-duplex capability when connecting with a second network node (e.g., during a RRC connection procedure). If the first network node indicates that it is capable of full-duplex operation prior to the connection, then the second network node may expect that the first network node may be capable of performing full-duplex communications as long as the first network node is connected with the second network node.

In some cases, however, the full-duplex capability of the first network node may change while connected with the second network node. For example, the first network node may enter a power savings mode, the first network node may experience a shortage of computational resources available to use for full-duplex communications, or the first network node may experience a significant increase in self-interference in full-duplex communications. Self-interference may occur when transmissions and receptions of signals to and from the first network node interfere with each other. Thus, to change its full-duplex capability, the first network node may disconnect from the second network node, indicate the changed or updated full-duplex capability, and then reconnect in accordance with the changed or updated full-duplex capability. However, such processes may increase communication delays, reduce resource utilization efficiency, and reduce the reliability of communications between the first network node and the second network node.

Techniques of the present disclosure describe support dynamically transmitting a multi-part, full-duplex capability message for full-duplex communications. For example, a first network node (e.g., a UE 115) may indicate a full-duplex capability in a first message (a first part of the multi-part capability message) prior to connecting with a second network node (e.g., a UE 115, a network entity 105). After connecting with the second network node and before, during, or after exchanging data with the second network node, the first network node may transmit a second message (a second part of the multi-part capability message) updating the full-duplex capability of the first network node indicated in the first message. In some cases, the second message may indicate a change in the full-duplex capability (e.g., indicating the first network node is no longer capable of full-duplex communications), or the second message may reaffirm the full-duplex capability and, in some cases, indicate a set of additional parameters associated with the full-duplex capability (e.g., indicating a minimum size of a guard band between the transmit and receive bands for the full-duplex communications). As such, the multi-part capability message may enable the first network node to dynamically indicate a full-duplex capability without disconnecting from the second network node, which may result in increased power savings, decreased latency and delay, and an overall improvement in communications.

Figure 2:
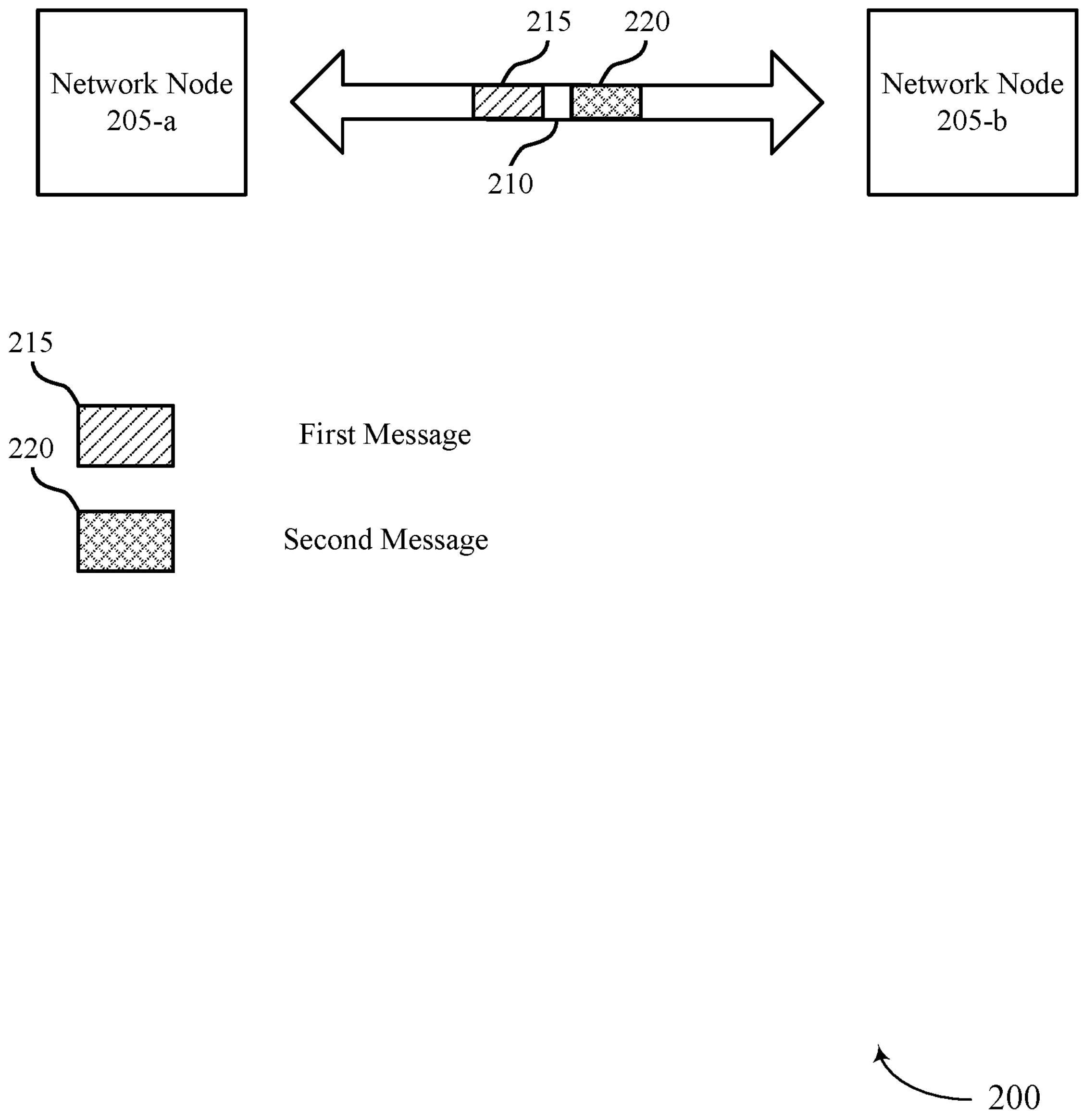
FIG. 2 illustrates an example of a wireless communication system that supports multi-part dynamic capability signaling for full-duplex communications in accordance with one or more aspects of the present disclosure.

FIG. 2 illustrates an example of a wireless communication system 200 that supports multi-part dynamic capability signaling for full-duplex communications in accordance with one or more aspects of the present disclosure. In some aspects, the wireless communication system 200 may implement or be implemented by the wireless communication system 100. For example, the wireless communication system may include a network node 205-*a* and a network node 205-*b*, which may examples of devices described herein with reference to FIG. 1 (e.g., a UE 115, a network entity 105, or an IAB node 104). In some aspects, the network node 205-*a* and the network node 205-*b* may communicate via a communication link 210, which may be an example of a communication link 125 described herein with reference to FIG. 1, such as a Uu link, a sidelink, a backhaul link, a D2D link or some other type of communication link. In some cases, the network node 205-*a* and the network node 205-*b* may communicate via the communication link 210 using any of described types of communication links.

In some aspects, the communication link 210 may be a sidelink communication link and the network node 205-*a* and the network node 205-*b* may communicate using sidelink communications. In some cases, the network node 205-*a* and the network node 205-*b* may use sidelink communications to relay coverage extension, for power saving, or for low power peer-to-peer communications between the network nodes 205. When performing sidelink communications, the network node 205-*a* and the network node 205-*b* may communicate using a first sidelink mode or a second sidelink mode.

The first sidelink mode (e.g., a network-controlled mode) may occur when a network entity 105 manages the sidelink communications and indicates available resources for the sidelink communications to the network node 205-*a* and the network node 205-*b*. The second sidelink mode (e.g., a UE sensing-based mode) may occur when the network node 205-*a* and the network node 205-*b* sense the available resources for sidelink communications and use the available resources for sidelink communications. In the second sidelink mode, the network node 205-*a* and the network node 205-*b* may announce (e.g., broadcast) parameters for the sidelink communications including resource assignments (e.g., both current and future) and time and frequency domain positions of transmissions.

Using the communication link 210 as a sidelink communication link or any other type of communication link, the network node 205-*a* and the network node 205-*b* may communicate using a half-duplex communications mode or a full-duplex communications mode. In a half-duplex communications mode, the network node 205-*a* and the network node 205-*b* may each be configured to either receive or transmit communications at a given time. Half-duplex communications may reduce complexity and power consumption, however, may result in a relatively high level of delay and latency. Alternatively, in a full-duplex communications mode, the network node 205-*a* and the network node 205-*b* may both transmit and receive messages with each other simultaneously. In some cases, full-duplex communications may reduce the latency and delay associated with half-duplex communications, however full-duplex communications may result in an increased level of power consumption. For example, the full-duplex communications may result in an increased level of power consumption due to a network node simultaneously running transmission and receive changes, more MIMO layers compared to half-duplex communications, additional decoding operations compared to half-duplex communications, or any combination thereof.

In some cases, the network node 205-*a* and the network node 205-*b* may also support a sub-band full-duplex (SBFD) communications mode. SBFD communications may occur when the network nodes 205 allocate a portion of an antenna module (e.g., a portion of antenna elements) and frequency resources to uplink communications and then another portion of the antenna module and frequency resources to downlink communications. For example, the network nodes 205 may communicate via one or more SBFD symbols, where an SBFD symbol may include one or more subbands allocated for uplink communications and one or more subbands allocated for downlink or flexible communications. SBFD communications may further improve communications between the network nodes 205 by reducing the level of power consumption while still reducing the delay and latency as the network nodes 205 may perform uplink and downlink communications simultaneously on a subband-basis. In some aspects of SBFD communications, the network nodes 205 may support partially overlapping full-duplex communication modes or fully overlapping full-duplex communication modes (e.g., a single-frequency full-duplex mode), which may depend on capabilities of the network nodes 205.

When communicating using the full-duplex communications mode, the network node 205-*a* and the network node 205-*b* may transmit indications of their respective full-duplex capabilities. For example, the network node 205-*a* may transmit a first message 215 that indicates a first capability of the corresponding network node 205 to support full-duplex communications. The network node 205-*a* may transmit the first message 215 prior to the network nodes 205 being RRC-connected (e.g., prior to an RRC-connection procedure). If both the network node 205-*a* and the network node 205-*b* are capable of full-duplex communications as indicated in the first message 215, the network node 205-*a* and the network node 205-*b* may perform an RRC connection procedure and start a full-duplex communications session. Alternatively, if at least one of the network node 205-*a* or the network node 205-*b* indicate a lack of support for the full-duplex communications (e.g., are incapable of performing the full-duplex communications), the network node 205-*a* and the network node 205-*b* may perform an RRC connection procedure and start a half-duplex communications session.

In some aspects, the network node 205-*b* may expect the network node 205-*a* to communicate in accordance with the full-duplex capability indicated in the first message 215 for an entire duration of the RRC connection. However, in some cases, the full-duplex capability of the network node 205-*a* may change such that the network node 205-*a* may no longer be able to support the same full-duplex capability indicated via the first message 215. To change or update the full-duplex capability indicated in the first message 215, the network node 205-*a* may transmit a multi-part capability message, where the first message 215 may be a first part of the multi-part capability message.

In a second part of the multi-part capability message, after connecting with the network node 205-*b* and while RRC-connected to the network node 205-*b*, the network node 205-*a* may transmit a second message 220 indicating an update or change to the full-duplex capability indicated in the first message 215. In some aspects, the network node 205-*a* may transmit the second message 220 after connecting with the network node 205-*b* and before, during, or after exchanging data with the network node 205-*b*. As such, the network node 205-*a* may dynamically indicate its full-duplex capability while connected with the network node 205-*b*. It should be understood that while the multi-part capability message is described herein as being transmitted by the network node 205-*a*, the network node 205-*a*, the network node 205-*b*, or both network nodes 205 may transmit the multi-part capability message to indicate respective full-duplex capabilities.

In some cases, the second message 220 (e.g., the second part of the multi-part capability message) may indicate that the network node 205-*a* is no longer capable of supporting full-duplex communications. For example, the increased power consumption of full-duplex operations may cause a power level of the network node 205-*a* to fall below a power level threshold or a processing load may be above a processing load threshold. As such, to support power savings, the network node 205-*a* may transmit the second message 220 indicating to change to a half-duplex communications mode or terminate the connection between the network node 205-*a* and the network node 205-*b*.

In some other cases, the network node 205-*a* may identify a reduction or shortage in resources available for full-duplex communications and transmit the second message 220 indicating a cancellation of the full-duplex communications mode or a change in the full-duplex capability indicated via the first message 215. For example, network node 205-*a* may lack a suitable beam for beamforming or an antenna panel or module (e.g., a set of antenna elements) to perform the full-duplex communications due to being in communication with a third network node 205 (not illustrated). Therefore, the network node 205-*a* may transmit the second message 220 to indicate the change in the full-duplex capability indicated via the first message 215 while maintaining the RRC-connection to the network node 205-*b*. The second message 220 may change (e.g., reduce) the full-duplex capability, indicate to switch to a half-duplex communications mode, or terminate the RRC connection between the network node 205-*a* and the network node 205-*b*.

If the first message 215 indicates that the network node 205-*a* is capable of supporting full-duplex communications, and if there are no changes to the full-duplex capability, the second message 220 may reaffirm the full-duplex capability. In some cases, the second message 220 may also indicate a set of additional parameters to further define the full-duplex capability of the network node 205-*a* indicated in the first message 215. In some cases, the set of additional parameters may enhance the full-duplex communications session between the network node 205-*a* and the network node 205-*b*. In some aspects, the parameters may include one or more types of full-duplex communication modes supported by the network node 205-*a* (e.g., an SBFD mode, a partial-overlap full-duplex mode, and a single-frequency full-duplex mode). For the one or more types of full-duplex communication modes supported by the network node 205-*a*, the set of parameters may include a maximum power level of the network node 205-*a*, one or more types of channels supported (e.g., shared channel, feedback channel), a quantity of transmission layers per direction (e.g., receiving and transmitting), a quantity of transmission configuration indicator (TCI) states per direction, or a length of time for which the full-duplex capability indicated via the first message 215 and the set of additional parameters indicated via the second message 220 may be valid. In some cases, the set of additional parameters may be for multiple full-duplex communication modes where each of the indicated parameters may be associated with all of the one or more types of full-duplex communication modes supported by the network node 205-*a*. In some other cases, the network node 205-*a* may separately indicate a set of additional parameters for each of the one or more types of full-duplex communication modes.

Using the multi-part capability message to indicate changes to a full-duplex capability of the network nodes 205 (e.g., before an RRC connection and after the RRC connection and before, during, or after a data exchange), as described herein, the network node 205-*a* may dynamically indicate its full-duplex capability at different times. At these different times, the network node 205-*a* may use the multi-part capability message to dynamically update or change its full-duplex capability. As such, the multi-part capability message may increase the reliability of communications and decrease the delay that may result if instead the network node 205-*a* terminates the connection with the network node 205-*b* to change the full-duplex capability indication. The multi-part capability message may also enable the network node 205-*a* to indicate different full-duplex capabilities to different network nodes 205 (e.g., the network node 205-*b* and a third network node 205), thus optimizing its power and resources according to the link priority. Additionally, such techniques described herein of using the multi-part capability message to reduce the delay in communications and increase communications reliability may be further described herein including with reference to FIGS. 3-6.

Figure 3:
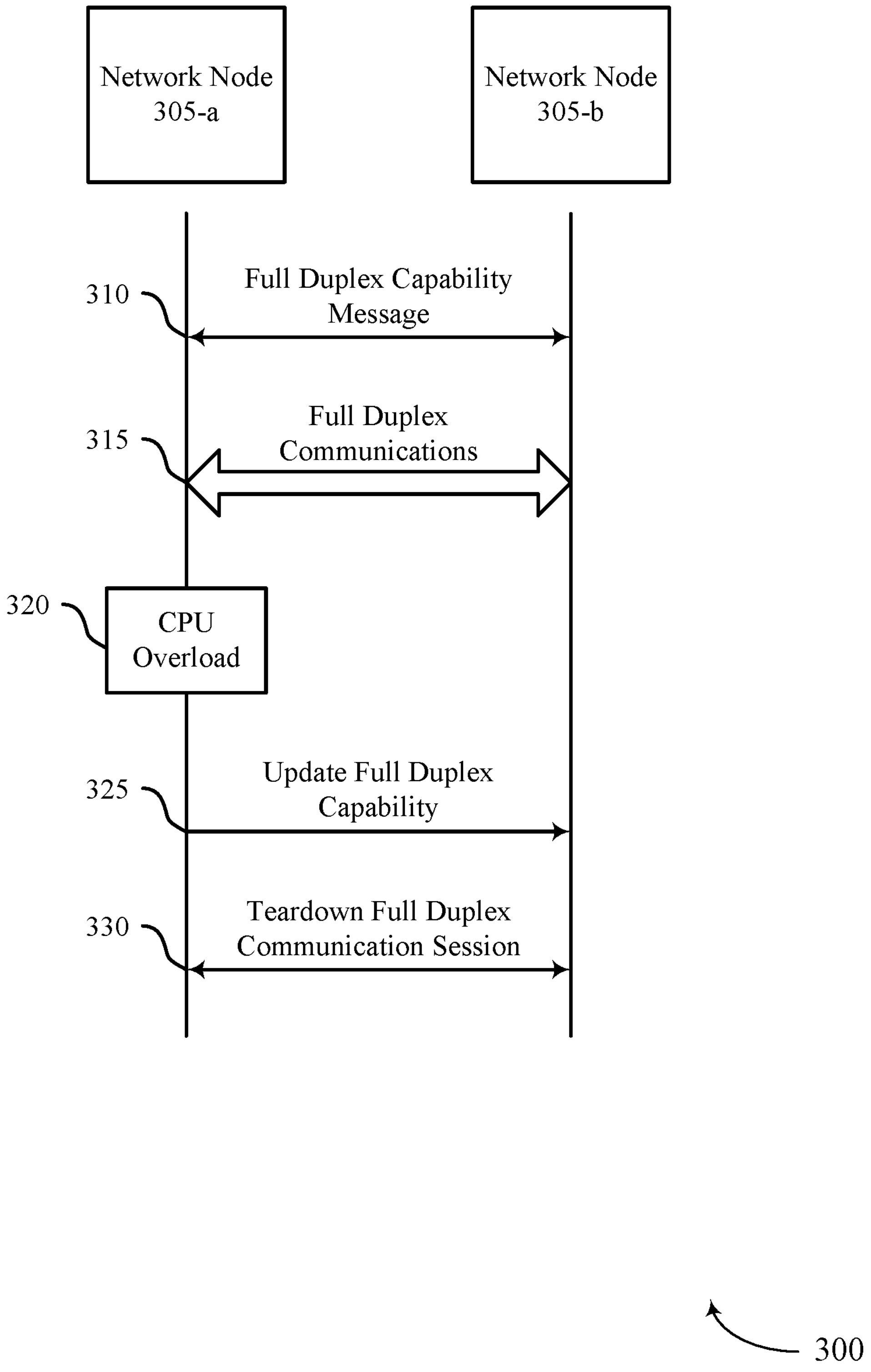
FIGS. 3-6 illustrate examples of a process flow that supports multi-part dynamic capability signaling for full-duplex communications in accordance with one or more aspects of the present disclosure.

FIG. 3 illustrates an example of a process flow 300 that supports multi-part dynamic capability signaling for full-duplex communications in accordance with one or more aspects of the present disclosure. In some aspects, the process flow 300 may implement or be implemented by the wireless communication system 100 or the wireless communication system 200. For example, the process flow 300 may include a network node 305-*a* and a network node 305-*b*, which may examples of devices described herein with reference to FIGS. 1-2 (e.g., a UE 115, a network entity 105, or an IAB node 104). In the following description of the process flow 300, the operations between the network node 305-*a* and the network node 305-*b* may be performed in different orders or at different times. Some operations may also be left out of the process flow 300, or other operations may be added. Although the network node 305-*a* and the network node 305-*b* (which may be examples of UEs 115) are shown performing the operations of the process flow 300, some aspects of some operations may also be performed by one or more other wireless devices.

At 310, the network node 305-*a* may transmit, to the network node 305-*b*, a first message as a first part of a multi-part capability message. The first message may dynamically indicate a full-duplex capability of the network node 305-*a* before the network node 305-*a* connects with the network node 305-*b* or any other network node 305. The first message may indicate a first capability of the network node 305-*a* to support full-duplex communications and may be a broadcast message, a multicast message, a groupcast message, or a unicast message. For example, the network node 305-*a* may be unaware of what other network nodes 305 may be located near the network node 305-*a*, and as such the network node 305-*a* may transmit the first message to any neighboring network node 305 via a broadcast message or multicast message. However, in some cases, the network node 305-*a* may be aware of one or more neighboring network nodes 305 and may transmit the first message to a group of network nodes 305 via a multicast or groupcast message. Additionally, or alternatively, the network node 305-*a* may transmit the first message to a specific network node (e.g., the network node 305-*b*) via a unicast message.

In some cases, the first message may be static and associated with the hardware capability of the network node 305-*a*. For example, the network node 305-*a* may lack the antenna modules or antenna elements to operate in a full-duplex communications mode. In such cases, the first message may indicate that the network node 305-*a* lacks the capability to operate in the full-duplex communications mode. In some aspects where the network node 305-*a* may be capable of full-duplex communications, the first message may also include information about a type of full-duplex communications mode supported by the network node 305-*a* (e.g., an SBFD mode, a partially overlapping full-duplex mode, or a single-frequency full-duplex mode). In some other cases, the network node 305-*a* may transmit the first message based on an estimated capability of the network node 305-*a*. For example, the network node 305-*a* may estimate its processing load in one or more upcoming slots and estimate if it may be capable to operate in the full-duplex communications mode during those slots.

The first message may indicate the full-duplex capability of the network node 305-*a* via a fixed quantity of bits. For example, the first message may include a single bit indicating whether the network node 305-*a* may be capable of operating in the full-duplex communications mode. In some other cases, there may be a fixed quantity of bits that indicate the type of full-duplex communications mode supported by the network node 305-*a* based on the current processing load of the network node 305-*a*, the estimated processing load of the network node 305-*a*, or both.

After transmitting the first message, the network node 305-*a* may become RRC-connected with another network node (e.g., network node 305-*b*). In some aspects, network nodes 305 capable of full-duplex communications may prefer to connect with other network nodes 305 that are capable of full-duplex communications. In such cases, to enhance communications, the network node 305-*b* may also transmit the first message indicating its full-duplex capability. In some cases, the network node 305-*b* may transmit its full-duplex capability based on receiving the first message from the network node 305-*a*. If both the network node 305-*a* and the network node 305-*b* indicate that they may be capable of operating in the full-duplex communications mode, the network node 305-*a* and the network node 305-*b* may connect via an RRC connection procedure.

At 315, after the network node 305-*a* and the network node 305-*b* becoming RRC-connected, the network node 305-*a* and the network node 305-*b* may begin performing full-duplex communications. During the full-duplex communications, the network node 305-*a* and the network node 305-*b* may both transmit and receive data communications simultaneously. In some cases, the network node 305-*a* or the network node 305-*b* may also be in communications with one or more other network nodes 305. Such communications may be full-duplex communication or half-duplex communications.

At 320, the network node 305-*a* may detect a central processing unit (CPU) overload. For example, due to communications with the network node 305-*b*, communications with other network nodes 305, or both, the processing load of the network node 305-*a* may be above a processing load threshold. In some cases, the processing load threshold may be associated with the processing capabilities of the network node 305-*a*. For example, the ability of the network node 305-*a* to perform complex computations and procedures may be based on the physical hardware of the network node 305-*a*. In some cases, if the processing load of the network node 305-*a* exceeds the processing load threshold, the network node 305-*a* may be at risk of overheating. Additionally, or alternatively, the CPU of the network node 305-*a* may prevent the network node 305-*a* from performing communications until a time period where the processing load may be below the processing load threshold, thus adding some delay to the communications with the network node 305-*b*.

In some other cases, at 320, the network node 305-*a* may detect that a power level of the network node 305-*a* may be below a power level threshold. The power level threshold may be associated with a battery level of the network node 305-*a*. If the power level falls below the power level threshold, the network node 305-*a* may lack the power to continue full-duplex communications. Since full-duplex communications may be relatively high in power consumption and may include relatively complex processing procedures, the network node 305-*a* may suffer from a relatively large rate of power reduction. As such, the network node 305-*a* may enter a power savings mode or a low power mode to prevent the full-duplex communications having an increase in delay, a decrease in reliability, or both.

At 325, in response to entering the power savings mode or low power mode or in response to the processing load being above the processing threshold, the network node 305-*a* may transmit a second message to the network node 305-*b* as a second part of a multi-part capability message to dynamically update the full-duplex capability of the network node 305-*a*. The second message may indicate a second capability of the network node 305-*a* to support the full-duplex communications and may be a groupcast message to all network nodes 305 in communication with the network node 305-*a* or a unicast message to a specific network node (e.g., the network node 305-*b*). The network node 305-*a* may transmit the second message before, during, or after communicating with and exchanging data with the network node 305-*b* (using full-duplex operation). In some cases, the network node 305-*a* may transmit the second message indicating the second capability before data communications with the network node 305-*b*, and the second capability may be based on a calculated transmission-reception processing load. Additionally, or alternatively, the second capability may indicate a change in parameters to be used for the full-duplex communications, such as the quantity of MIMO layers, a subcarrier spacing, or a set of active beams, among other parameters.

In some aspects, the network node 305-*a* may transmit a control message to the network node 305-*b* indicating the power level or the processing level of the network node 305-*a*. In response to, or in conjunction with, transmitting the control message, the network node 305-*a* may transmit the second message to indicate that the network node 305-*a* may no longer be capable of operating in the full-duplex communications mode as indicated via the first message. That is, the first message at 310 (e.g., the first part of the multi-part capability message) may indicate that the network node 305-*a* may be capable of operating in a full-duplex communications mode. Following the network node 305-*a* entering a power saving mode, the second message (e.g., the second part of the multi-part capability message) may indicate that the network node 305-*a* may lack the capability of operating in the full-duplex communications mode for future communications.

In some cases, the network node 305-*a* may multiplex or otherwise transmit the control message and the second message together instead of separately to reduce overhead). In some other aspects, the network node 305-*a* may refrain from transmitting the second message altogether. In such cases, if the control message indicates that the power level may be below a power level threshold or the processing load may be above a processing load threshold, the network node 305-*a* and the network node 305-*b* may automatically begin a tear-down procedure or modification procedure to the full-duplex communications session (further described at 330).

Additionally, or alternatively, the second message may indicate a change in the full-duplex communications mode. For example, to support power savings, the second message may indicate a decrease in the quantity of MIMO layers or the set of active beams used for the full-duplex communications. In some cases, such changes to the full-duplex communications may reduce efficiency for power savings and processing load reductions. As such, the second message may indicate to initiate a tear-down procedure of the full-duplex communication session initiated at 315. In some aspects, if the second message indicates a change in the full-duplex capability due to the network node 305-*a* entering a power savings mode, while RRC-connected with the network node 305-*b*, the network node 305-*a* may transmit additional messages updating the full-duplex capability before, during, or after exchanging data with the network node 305-*b*. For example, the network node 305-*a* may transmit the second message before exchanging data with the network node 305-*b*. In response to entering a power savings mode, and after leaving the power savings mode, the network node 305-*a* may transmit an additional message updating the full-duplex capability while exchanging data.

At 330, the network node 305-*a* may initiate a tear-down procedure of the full-duplex communication session with the network node 305-*b* based on transmitting the second message at 325. In such cases, the second message 325 may indicate that the network node 305-*a* may no longer be capable of full-duplex communication. In some aspects, the tear-down procedure may be initiated automatically after the network node 305-*a* transmits the control message at 325. The tear-down procedure may include terminating the full-duplex communication session between the network node 305-*a* and the network node 305-*b*. In some cases, if second message indicates that the network node 305-*a* may have enough of a power level and enough of a processing load, following the termination of the full-duplex communication session, the network node 305-*a* may initiate a half-duplex communication session with the network node 305-*b*.

In some cases, such procedures of dynamically indicating the full-duplex capability via the multi-part capability message may allow for increased reliability in communications and reduced delay in communications between the network node 305-*a* and the network node 305-*b*. Further techniques for enhancing communications using the multi-part capability message may be described elsewhere herein, including with reference to FIGS. 4-6.

Figure 4:
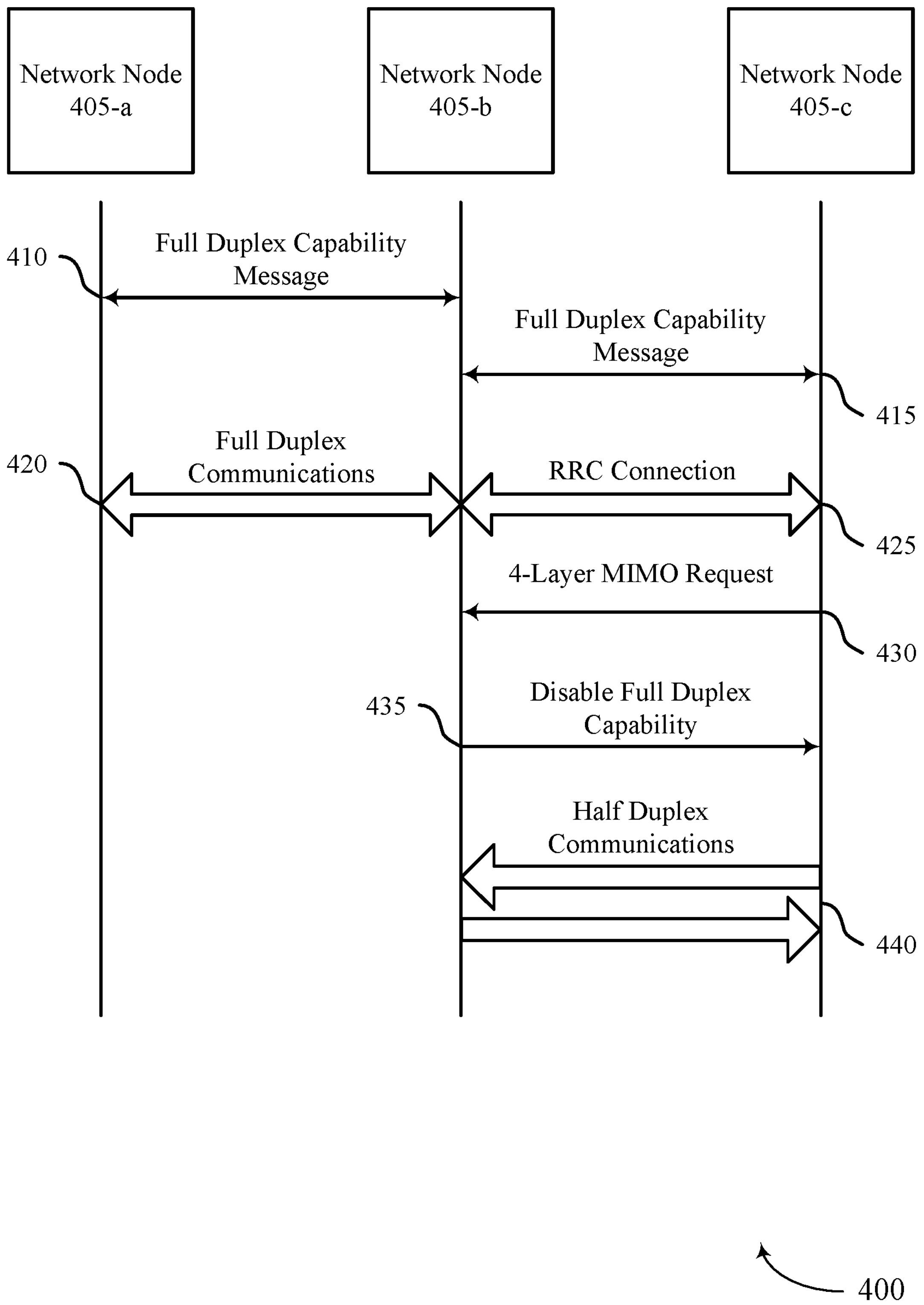

FIG. 4 illustrates an example of a process flow 400 that supports multi-part dynamic capability signaling for full-duplex communications in accordance with one or more aspects of the present disclosure. In some aspects, the process flow 400 may implement or be implemented by the wireless communication system 100 or the wireless communication system 200. For example, the process flow 400 may include a network node 405-*a*, a network node 405-*b*, and a network node 405-*c*, which may examples of devices described herein with reference to FIGS. 1-2 (e.g., a UE 115, a network entity 105, or an IAB node 104). In the following description of the process flow 400, the operations between the network node 405-*a*, the network node 405-*b*, and the network node 405-*c* may be performed in different orders or at different times. Some operations may also be left out of the process flow 400, or other operations may be added. Although the network node 405-*a*, the network node 405-*b*, and the network node 405-*c* (which may be examples of UEs 115) are shown performing the operations of the process flow 400, some aspects of some operations may also be performed by one or more other wireless devices.

At 410 and 415, at least one of the network node 405-*a*, the network node 405-*b*, and the network node 405-*c* may transmit a first message as a first part of a multi-part capability message to dynamically indicate a full-duplex capability of the corresponding network node 405. The network node 405-*a* may transmit the first message to the network node 405-*b* indicating a first capability of the network node 405-*a* to support full-duplex communications. In addition, the network node 405-*c* may transmit the first message to the network node 405-*b* indicating a first capability of the network node 405-*c* to support full-duplex communications. Further, the network node 405-*b* may transmit the first message to the network node 405-*a* and the network node 405-*c* indicating a first capability of the network node 405-*b* to support full-duplex communications. In some cases, the network node 405-*a*, the network node 405-*b*, and the network node 405-*c*, may each indicate a respective capability for operating in a full-duplex communication mode.

At 420, in response to both the network node 405-*a* and the network node 405-*b* being capable of communicating in a full-duplex communications mode, the network node 405-*a* and the network node 405-*b* may become RRC-connected and initiate full-duplex communications. The network node 405-*a* and the network node 405-*b* may initiate the full-duplex communications based on both the network node 405-*a* and the network node 405-*b* being capable of operating in a full-duplex communications mode.

At 425, the network node 405-*b* and the network node 405-*c* may become RRC-connected. In some cases, the network node 405-*b* and the network node 405-*c* may refrain from beginning a communication session (e.g., full-duplex or half-duplex) due to a lack of data to be exchanged between the network node 405-*b* and the network node 405-*c*. As such, the network node 405-*b* may allocate all or most of the resources available for full-duplex communications for communicating with the network node 405-*a*.

At 430, the network node 405-*c* may transmit a message requesting the network node 405-*b* to confirm (in some cases, update) the first capability of the network node 405-*b*. For example, the message may request the network node 405-*b* to use four MIMO layers for a full-duplex communication session between the network node 405-*b* and the network node 405-*c*. In some aspects, the network node 405-*c* may automatically transmit the MIMO layer request or other requests to confirm the full-duplex capability of the network node 405-*b* in response to completing the RRC connection. In some other aspects, the network node 405-*c* may transmit requests to confirm the full-duplex capability of the 405-*b* as needed during the duration of the RRC connection with the network node 405-*b*.

In some cases, due to the network node 405-*b* using all or most of the resources available for full-duplex communications for communicating with the network node 405-*a*, the network node 405-*b* may be unable to satisfy the request from the network node 405-*c* to use four MIMO layers for communications with the network node 405-*b* in the full-duplex communications mode. As such, the network node 405-*b* and the network node 405-*c* may refrain from initiating a full-duplex communication session.

At 435, the network node 405-*b* may transmit a second message as a second part of the multi-part capability message. The second message may indicate a second capability that may update the first capability indicated via the first message at 415. For example, the second capability may indicate that the network node 405-*b* may no longer be capable of performing full-duplex communications with the network node 405-*c*. In some cases, this change in capability may be based on the request from the network node 405-*c* to confirm (and in some cases, update) the full-duplex capability of the network node 405-*b*. Additionally, or alternatively, the network node 405-*b* may transmit the second message based on a shortage of resources for full-duplex communications due to the communications with the network node 405-*a*, communications with other network nodes 405, or both. In some cases, the network node 405-*b* may have begun the full-duplex communications with the network node 405-*a* prior to receiving the request from the network node 405-*c*. As such, the network node 405-*b* may have allocated all or most of the available resources for full-duplex communications to performing the full-duplex communications with the network node 405-*a*. For example, the network node 405-*b* may lack slots or frequency occasions for full-duplex communications with any other network nodes 405 (e.g., network node 405-*c*). Therefore, when the network node 405-*c* requests to initiate full-duplex communications, the network node 405-*b* may be unable to perform such full-duplex communications with the network node 405-*c* due to the lack of resources.

In some cases, subsequent to the network node 405-*b* transmitting the second message (indicating that the 405-*b* may no longer be able to operate in the full-duplex communications mode), the network node 405-*b* may transmit an indication of a length of time which the second message may be valid for. In some aspects, the indication may start a timer. Upon expiration of the timer, the second message may become invalid and the network node 405-*c* may retransmit the request to confirm and update the full-duplex capability of the network node 405-*b*. In some cases, the length of the timer may be implicitly defined or related to a connection between the network node 405-*b* and another network node 405 (e.g., the network node 405-*a*). For example, when the full-duplex communication between the network node 405-*a* and the network node 405-*b* terminates, the timer may expire as the network node 405-*b* may now have additional resources to use for full-duplex communications. As such, upon the expiration of the timer, the network node 405-*c* may retransmit the request for the network node 405-*b* to use four MIMO layers for a full-duplex communication session between the network node 405-*b* and the network node 405-*c*. In some cases, based on the full-duplex communication session with the network node 405-*a* being terminated, the network node 405-*b* may transmit a third message to the network node 405-*c* (not illustrated), as a third part of the multi-part capability message, indicating that the network node 405-*b* may be able to fulfill the request from the network node 405-*c*. That is, the third message may indicate that the network node 405-*b* may be able to support full-duplex communications again.

At 440, in response to the network node 405-*b* transmitting the second message updating the full-duplex capability of the network node 405-*b*, the network node 405-*b* and the network node 405-*c* may initiate half-duplex communications instead of full-duplex communications. In some cases, after the termination of the full-duplex communications between the network node 405-*a* and the network node 405-*b*, the network node 405-*b* may transmit a third message (not illustrated) as a third part of the multi-part capability message to the network node 405-*c*, the third message indicating an update to the full-duplex capability of the network node 405-*b*.

In cases that the third message indicates that the network node 405-*b* may be capable of full-duplex communications with the network node 405-*c*, the network node 405-*b* and the network node 405-*c* may terminate the half-duplex communication session and initiate a full-duplex communications session. As such, the multi-part capability message may allow the network node 405-*b* to dynamically indicate its full-duplex capabilities at different times (e.g., associated with an RRC connection and an exchange of data), thereby reducing unnecessary delay in communications. In some cases, such procedures of dynamically indicating the full-duplex capability between the network node 405-*a*, the network node 405-*b*, and the network node 405-*c* may allow the network nodes 405 to signal different full-duplex capabilities for different links to further enhance power consumption and resource usage considering the priority of each link's traffic. Further techniques and procedures for network nodes 405 using the multi-part capability message may be described herein including with reference to FIGS. 5 and 6.

Figure 5:
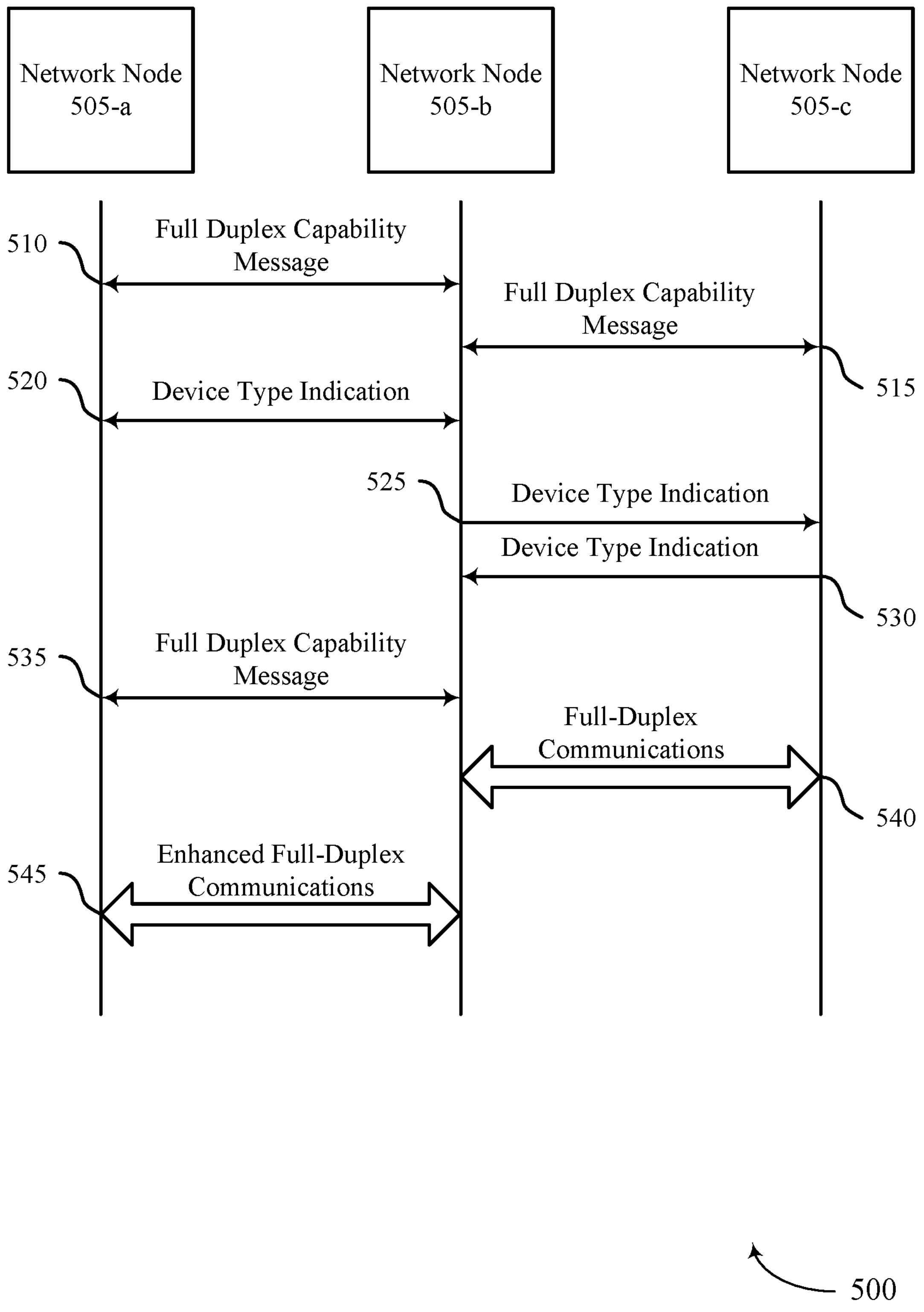

FIG. 5 illustrates an example of a process flow 500 that supports multi-part dynamic capability signaling for full-duplex communications in accordance with one or more aspects of the present disclosure. In some aspects, the process flow 500 may implement or be implemented by the wireless communication system 100 or the wireless communication system 200. For example, the process flow 500 may include a network node 505-*a*, a network node 505-*b*, and a network node 505-*c*, which may examples of devices described herein with reference to FIGS. 1-2 (e.g., a UE 115, a network entity 105, or an IAB node 104). In the following description of the process flow 500, the operations between the network node 505-*a*, the network node 505-*b*, and the network node 505-*c* may be performed in different orders or at different times. Some operations may also be left out of the process flow 500, or other operations may be added. Although the network node 505-*a*, the network node 505-*b*, and the network node 505-*c* (which may be examples of UEs 115) are shown performing the operations of the process flow 500, some aspects of some operations may also be performed by one or more other wireless devices.

At 510 and 515, at least one of the network node 505-*a*, the network node 505-*b*, and the network node 505-*c* may transmit a first message as a first part of a multi-part capability message to dynamically indicate a full-duplex capability of the corresponding network node 505. The network node 505-*a* may transmit the first message to the network node 505-*b* indicating a first capability of the network node 505-*a* to support full-duplex communications. In addition, the network node 505-*c* may transmit the first message to the network node 505-*b* indicating a first capability of the network node 505-*c* to support full-duplex communications. Additionally, or alternatively, the network node 505-*b* may transmit the first message to both the network node 505-*a* and the network node 505-*c* indicating a first capability of the network node 505-*b* to support full-duplex communications. In some cases, the network node 505-*a*, the network node 505-*b*, and the network node 505-*c* may each indicate a respective capability for operating in a full-duplex communication mode.

At 520, the network node 505-*a* may transmit a control message to the network node 505-*b* indicating a device type of the network node 505-*a*. In some aspects, the device type may also be associated with a design class of the network node 505-*a*. A design class may correspond to a group of network nodes 505 associated with the same hardware components (e.g., same antenna configurations, same CPUs), the same software components (e.g., beamforming codebooks), or both. In some cases, the design class may also refer to a manufacturer of the network node 505 or the protocol version supported by the network node 505. As such, the network node 505-*a* may transmit the control message indicating that the network node 505-*a* corresponds to a first device type. In some cases, the network node 505-*b* may transmit a control message to the network node 505-*a* indicating that the network node 505-*b* also corresponds to the first device type. In some other cases, the network node 505-*b* may indicate via the control message that the network node 505-*b* corresponds to a different device type than the first device type, where the different device type may still be compatible with the first device type. For example, the network node 505-*b* may lack all of the same components of the network node 505-*a*, however such components of the network node 505-*b* may be similar and compatible to those of the network node 505-*a*. Therefore, both the network node 505-*a* and the network node 505-*b* may correspond to the same device type (e.g., the first device type) or at least similar and compatible device types.

At 525, the network node 505-*b* may transmit a control message to the network node 505-*c* indicating that the network node 505-*b* corresponds to the first device type. At 530, the network node 505-*c* may transmit a control message to the network node 505-*b* indicating that the network node 505-*c* corresponds to a second device type. In some aspects, the first device type and the second device type may be incompatible. As such, the device types of the network node 505-*b* and the network node 505-*c* may be incompatible for some communication modes. If two network nodes 505 correspond to compatible device types and both may be capable of operating in a full-duplex communication mode, the network nodes 505 may support an enhanced full-duplex communications mode.

At 535, the network node 505-*a* may transmit a second message to the network node 505-*b* indicating a second capability of the network node 505-*b* to support full-duplex communications. In some cases, the second capability may update the full-duplex capability of the network node 505-*a* based on the device types of both the network node 505-*a* and the network node 505-*b* being the same or at least compatible. As such, the second capability may indicate parameters to initiate an enhanced full-duplex communication session.

The enhanced full-duplex communications may result in further increased accuracy and reliability of communications and further reduced delays of standard full-duplex communications. In some other cases, the network node 505-*a* may transmit the second message in response to the types of full-duplex communication modes supported by the network node 505-*a* and the network node 505-*b* or in response to the current CPU or processing load at the network node 505-*a*. For example, if the device types of the network node 505-*a* and the network node 505-*b* are compatible but the current CPU or processing load at the network node 505-*a* is above a processing load threshold for an enhanced full-duplex communications mode, the network node 505-*a* may refrain from updating the full-duplex capability. As such, the second capability may simply reaffirm the full-duplex capability indicated via the first message.

In some aspects, if the network node 505-*b* receives the indication that the network node 505-*a* and the network node 505-*b* may correspond to the same device type (e.g., the first device type), the network node 505-*b* may transmit an update to the full-duplex capability of the network node 505-*b*. As such, the network node 505-*a* may transmit the second message indicating the second capability of the network node 505-*a* based on receiving the update to the full-duplex capability of the network node 505-*b*. In some other aspects, if the network node 505-*b* receives the indication that the network node 505-*a* corresponds to the same device type as the network node 505-*b*, the network node 505-*b* may request that the network node 505-*a* update its the full-duplex capability of the network node network node 505-*a*. As such, the network node 505-*a* may transmit the second message updating the full-duplex capability of the network node 505-*a* in response to the request from the network node 505-*b*. In some cases, the network node 505-*a* may deny the request based on being in communications with other network nodes 505, a shortage of resources, or the current CPU or processing load of the network node 505-*a*.

When the network node 505-*a* transmits the second message indicating the second capability to update the full-duplex capability to the network node 505-*a*, the update may include a set of full-duplex parameters indicated via a variable quantity of bits. In some cases, the set of full-duplex parameters may indicate which types of full-duplex communication modes may be supported by the network node 505-*a*. For example, the types of full-duplex communication modes that the network node 505-*a* may support may include fully overlapping communications (e.g., transmissions and receptions occur using overlapping time and frequency resources), partially overlapping communications, or SBFD communications.

In some cases, the set of full-duplex parameters may also indicate supported types of channels (e.g., physical sidelink shared channel (PSSCH), physical sidelink feedback channel (PSFCH)), a supported quantity of transmission layers per direction (e.g., transmission and reception), a supported quantity of TCI states per direction, or a supported maximum power value for the full-duplex communications (e.g., 20 dBm). In some aspects, as described with reference to FIG. 2, the set of full-duplex parameters may indicate additional parameters, and the network node 505-*a* may configure a set of full-duplex parameters separately for each full-duplex communication mode. Alternatively, the network node 505-*a* may configure the set of full-duplex parameters for any of the supported full-duplex communication modes. Additionally, or alternatively, based on the device types of the network node 505-*a* and the network node 505-*b*, the second message may indicate resources for an enhance beamforming procedure. As such, the second message may indicate additional parameters that may be used to further increase the reliability and accuracy of communications and decrease delays in communications.

At 540, the network node 505-*b* and the network node 505-*c* may initiate a full-duplex communications session. Even though the device types of the network node 505-*b* and the network node 505-*c* may be incompatible, both the network node 505-*b* and the network node 505-*c* may be capable of operating in the full-duplex communications mode. As such, to reduce delays associated with half-duplex communications, the network node 505-*b* and the network node 505-*c* may begin performing full-duplex communications.

At 545, the network node 505-*a* and the network node 505-*b* may initiate an enhanced full-duplex communications sessions. The enhanced full-duplex communications session may further reduce the power consumption associated with standard full-duplex communications while maintaining or further reducing delays associated with the standard full-duplex communications. In some cases, such procedures of dynamically indicating the full-duplex capability between the network nodes 505-*a*, the network node 505-*b*, and the network node 505-*c* may allow network nodes 505 to enhance the full-duplex communication with other network nodes 505 with compatible device types while maintaining standard full-duplex communications with network nodes 505 with non-compatible device types, resulting in an increase in reliability and a reduction in delay of communication. Such procedures and techniques for using the multi-part capability message to dynamically indicate the full-duplex capability of a network may be described herein, including with reference to FIG. 6.

Figure 6:
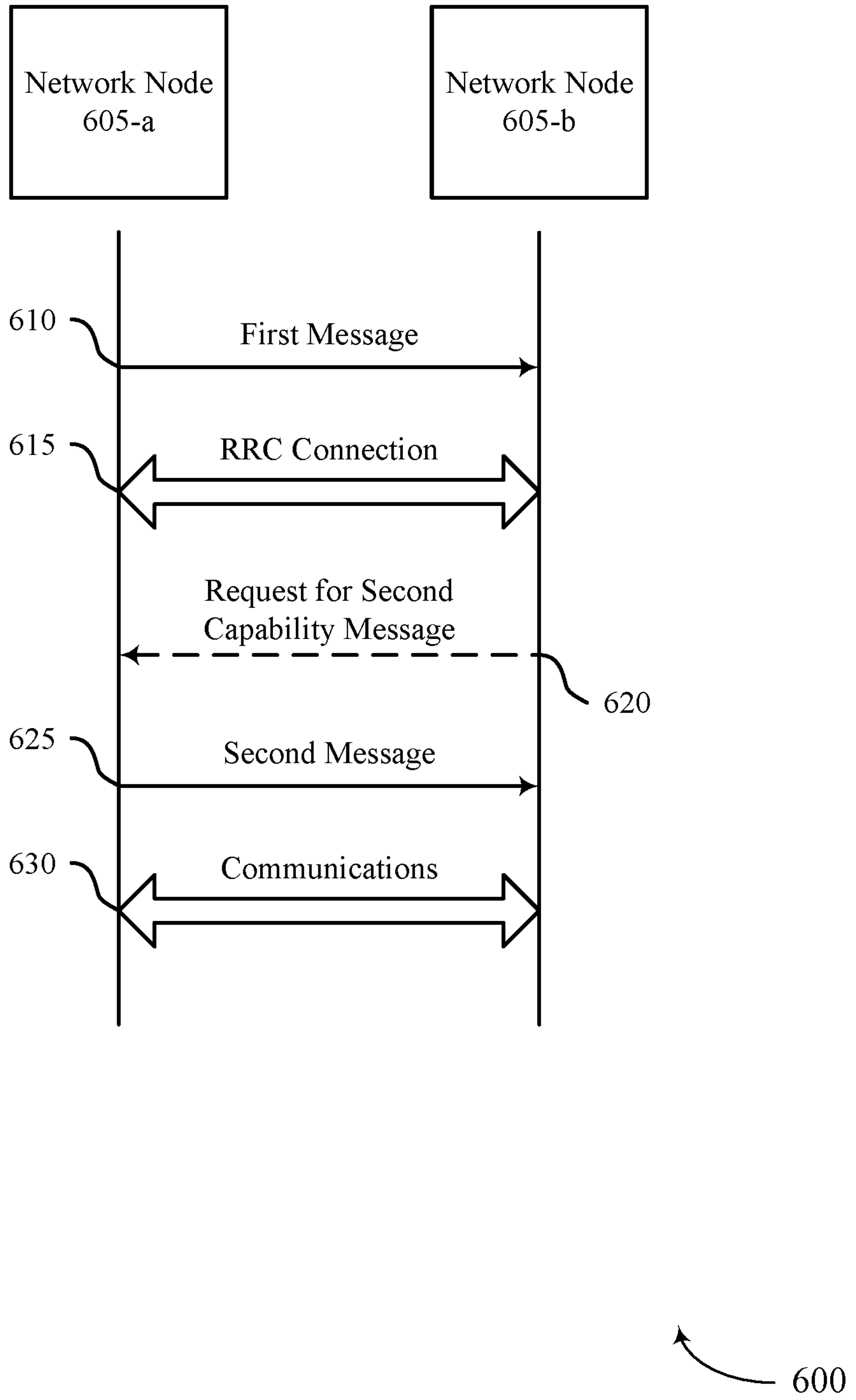

FIG. 6 illustrates an example of a process flow 600 that supports multi-part dynamic capability signaling for full-duplex communications in accordance with one or more aspects of the present disclosure. In some aspects, the process flow 600 may implement or be implemented by the wireless communication system 100 or the wireless communication system 200. The process flow 600 may include a network node 605-*a* and a network node 605-*b*, which may examples of devices described herein with reference to FIGS. 1-2 (e.g., a UE 115, a network entity 105, or an IAB node 104). For example, the network node 605-*a* and the network node 605-*b* may be examples of UEs 115. In the following description of the process flow 600, the operations between the network node 605-*a* and the network node 605-*b* may be performed in different orders or at different times. Some operations may also be left out of the process flow 600, or other operations may be added. Although the network node 605-*a* and the network node 605-*b* are shown performing the operations of the process flow 600, some aspects of some operations may also be performed by one or more other wireless devices.

At 610, the network node 605-*a* may transmit a first message to the network node 605-*b* before completing an RRC-connection with the network node 605-*b*. The first message may indicate a first capability of the network node 605-*b* to support full-duplex communications. In some aspects, the first message may be a first part of a multi-part capability message. The network node 605-*a* may transmit the first message to the network node 605-*b* as a broadcast message, a multicast message, a groupcast message, or a unicast message. In some cases, the network node 605-*a* may transmit a fixed quantity of bits in the first message indicating the first capability of the network node 605-*a*.

At 615, following the network node 605-*a* transmitting the first message, the network node 605-*a* and the network node 605-*b* may become RRC-connected (e.g., using an RRC connection procedure).

At 620, the network node 605-*a* may receive, from the network node 605-*b*, a request to update the first capability. In some aspects, the network node 605-*b* may transmit the request based on a capability of at least one of the network nodes 605 changing. Additionally, or alternatively, the network node 605-*a* may receive a message from the network node 605-*b* indicating a capability of network node 605-*b* to support the full-duplex communications.

At 625, after the network node 605-*a* transmits the first message and while being RRC-connected with the network node 605-*b*, the network node 605-*a* may transmit, to the network node 605-*b*, one or more second messages indicating a second capability of the network node 605-*a* to support the full-duplex communications. In some aspects, the network node 605-*a* may transmit the second messages before, during, or after an exchange of data with the network node 605-*b*. The second capability may indicate an update or change to the first capability indicated in the first message (transmitted at 610). In some aspects, the network node 605-*a* may transmit a second message in response to receiving the request at 620 to update the first capability of the network node 605-*a*. In some other aspects, the network node 605-*a* may transmit a second message in response to successfully connecting with the network node 605-*b*. Additionally, or alternatively, the network node 605-*a* may transmit a second message indicating the second capability after receiving the message from the network node 605-*b* indicating the full-duplex capability of the network node 605-*b*. As such, the second capability may be based on the capability of the network node 605-*b* received at 620. The second message may be a second part of the multi-part capability message.

In some cases, the second message may indicate that the second capability is the same as or is supplementary to the first capability of the network node 605-*a* transmitted at 610. In some other cases, the second capability may indicate that the network node 605-*a* may no longer be able to support the full-duplex communications. For example, prior to transmitting the second message, the network node 605-*a* may communicate with the network node 605-*b* based on the first capability indicated via the first message. While communicating with the network node 605-*b*, the network node 605-*a* may detect that a power level of the network node 605-*a* may be below a power level threshold or a processing load of the 605-*a* may be above a processing load threshold. As such, the network node 605-*a* may transmit a control message to the network node 605-*b* indicating the power level of the network node 605-*a*, the processing load of the network node 605-*a*, or both. In response to transmitting the control message, the network node 605-*a* may initiate and the network node 605-*b* may perform a modification procedure or a tear-down procedure for the full-duplex communications. In such cases, the network nodes 605 may automatically begin such procedures based on transmitting and receiving the control message indicating that the power level of the network node 605-*a* is above the power level threshold or that the processing load of the network node 605-*b* is above the processing load threshold.

In some other cases, the second message may include an indicate of a set of full-duplex parameters associated with the first capability of the network node 605-*a* to support the full-duplex communications indicated via the first message transmitted at 610. The set of full-duplex parameters may include one or more types of the network node 605-*a*, one or more types of full-duplex communications modes supported by the network node 605-*a*, a maximum power level of the network node 605-*a* in a full-duplex communications mode, one or more types of channels supported by the network node 605-*a* in the full-duplex communications mode, a quantity of transmission layers per direction supported by the network node 605-*a* in the full-duplex communications mode, a quantity of TCI states per direction supported by the network node 605-*a* in the full-duplex communications mode, or a length of time for which the first capability and the set of full-duplex parameters may be considered valid. In some aspects, the second message may transmit a quantity of bits that indicates the set of full-duplex parameters. The quantity of bits indicated in the second message may be based on the second capability transmitted via the second message.

At 630, the network node 605-*a* may communicate with the network node 605-*b* using the second capability indicated in one of the second messages. As such, the network node 605-*a* and the network node 605-*b* may use the multi-part capability message to dynamically indicate the full-duplex capability at different times while remaining RRC-connected. Further descriptions of such techniques of the present disclosure may be described herein including with reference to FIGS. 7-15.

Figure 7:
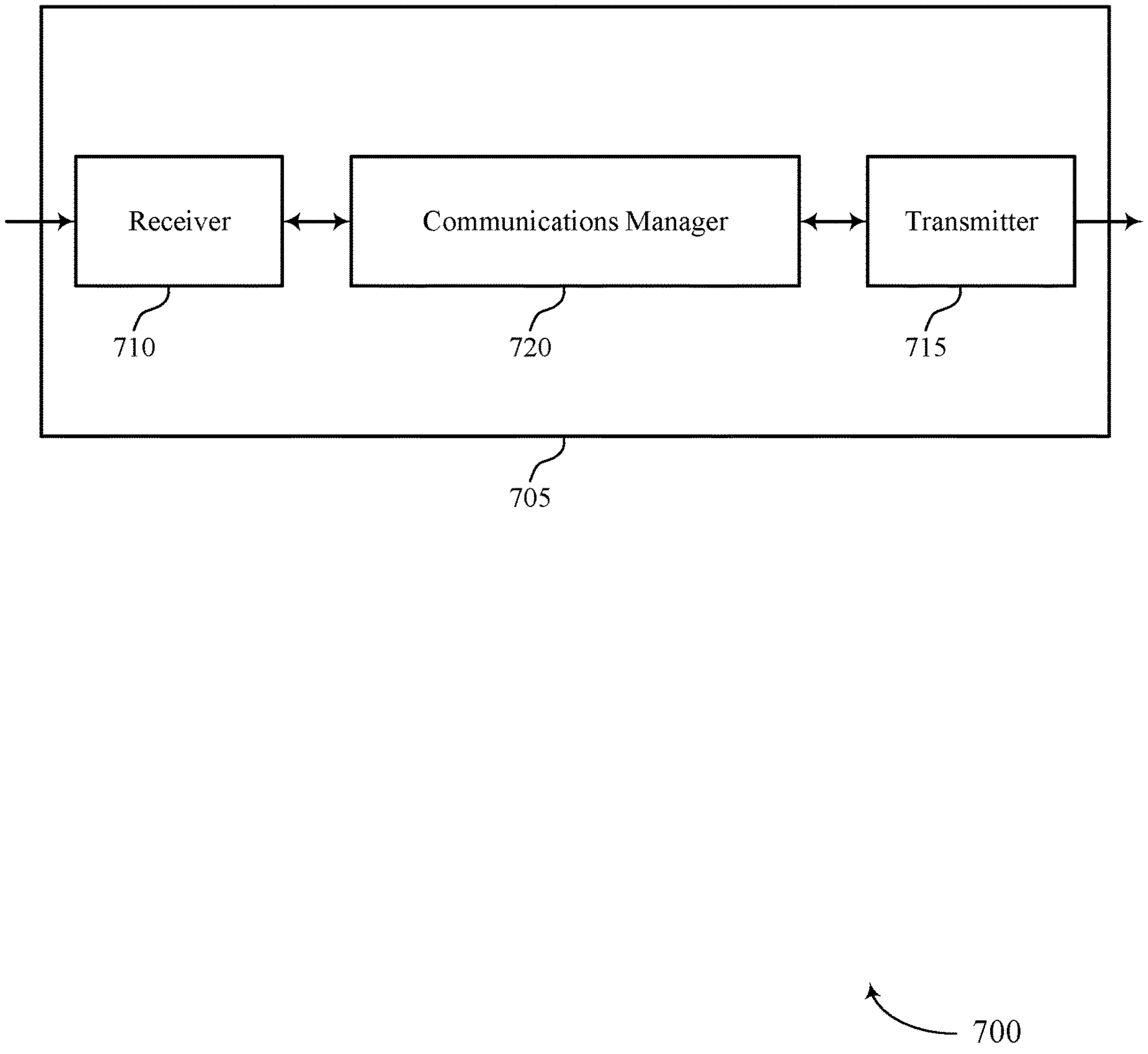
FIGS. 7 and 8 illustrate block diagrams of devices that support multi-part dynamic capability signaling for full-duplex communications in accordance with one or more aspects of the present disclosure.

FIG. 7 illustrates a block diagram 700 of a device 705 that supports multi-part dynamic capability signaling for full-duplex communications in accordance with one or more aspects of the present disclosure. The device 705 may be an example of aspects of a network node as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multi-part dynamic capability signaling for full-duplex communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multi-part dynamic capability signaling for full-duplex communications). In some aspects, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multi-part dynamic capability signaling for full-duplex communications as described herein. For example, the communications manager 720, the receiver 710, the transmitter 715, or various combinations or components thereof may support a method for performing one or more of the functions described herein.

In some aspects, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, In some aspects, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first wireless device in accordance with examples as disclosed herein. For example, the communications manager 720 may be configured as or otherwise support a means for transmitting, prior to being RRC-connected with a second wireless device, a first message that indicates a first capability of the first wireless device to support full-duplex communications. The communications manager 720 may be configured as or otherwise support a means for transmitting, after the first message and while the first wireless device and the second wireless device are RRC-connected, one or more second messages that indicates a second capability of the first wireless device to support the full-duplex communications, where the second capability is an update to the first capability. The communications manager 720 may be configured as or otherwise support a means for communicating with the second wireless device in accordance with the second capability indicated in a second message of the one or more second messages.

Additionally, or alternatively, the communications manager 720 may support wireless communication at a first wireless device in accordance with examples as disclosed herein. For example, the communications manager 720 may be configured as or otherwise support a means for receiving, prior to being PPC-connected with a second wireless device, a first message that indicates a first capability of the second wireless device to support full-duplex communications. The communications manager 720 may be configured as or otherwise support a means for receiving, after the first message and while the first wireless device and the second wireless device are RRC-connected, one or more second messages that indicates a second capability of the second wireless device to support the full-duplex communications, where the second capability is an update to the first capability. The communications manager 720 may be configured as or otherwise support a means for communicating with the second wireless device in accordance with the second capability indicated in a second message of the one or more second messages.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for a network node to use a multi-part capability message to reduce processing, reduce power consumption, and utilize communication resources more efficiently.

Figure 8:
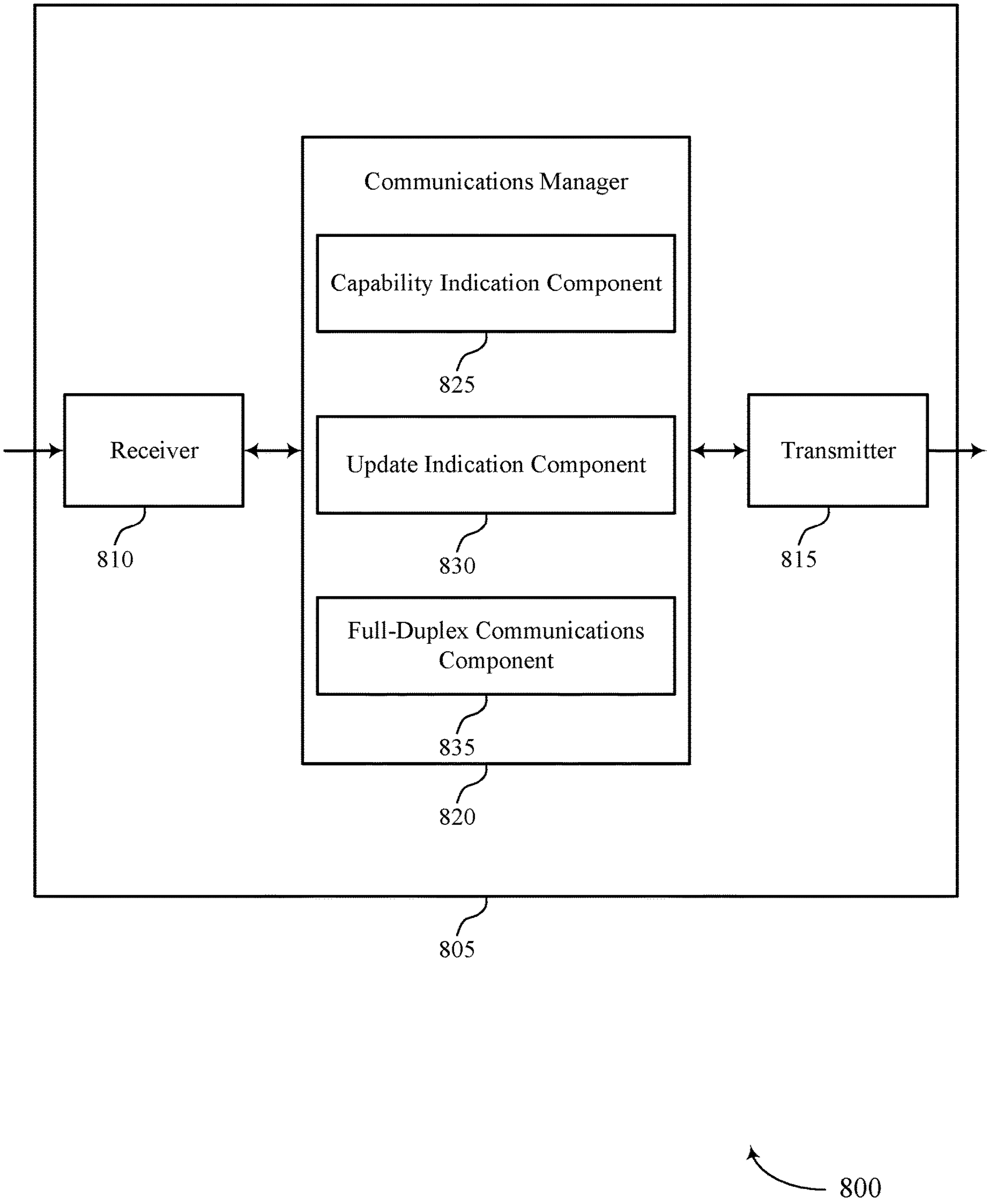

FIG. 8 illustrates a block diagram 800 of a device 805 that supports multi-part dynamic capability signaling for full-duplex communications in accordance with one or more aspects of the present disclosure. The device 805 may be an example of aspects of a device 705 or a network node (e.g., a UE 115) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multi-part dynamic capability signaling for full-duplex communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multi-part dynamic capability signaling for full-duplex communications). In some aspects, the transmitter 815 may be co-located with a receiver 810 in a transceiver module. The transmitter 815 may utilize a single antenna or a set of multiple antennas.

The device 805, or various components thereof, may be an example of means for performing various aspects of multi-part dynamic capability signaling for full-duplex communications as described herein. For example, the communications manager 820 may include a capability indication component 825, an update indication component 830, a full-duplex communications component 835, or any combination thereof. The communications manager 820 may be an example of aspects of a communications manager 720 as described herein. In some aspects, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first wireless device in accordance with examples as disclosed herein. The capability indication component 825 may be configured as or otherwise support a means for transmitting, prior to being RRC-connected with a second wireless device, a first message that indicates a first capability of the first wireless device to support full-duplex communications. The update indication component 830 may be configured as or otherwise support a means for transmitting, after the first message and while the first wireless device and the second wireless device are RRC-connected, one or more second messages that indicates a second capability of the first wireless device to support the full-duplex communications, where the second capability is an update to the first capability. The full-duplex communications component 835 may be configured as or otherwise support a means for communicating with the second wireless device in accordance with the second capability indicated in a second message of the one or more second messages.

Additionally, or alternatively, the communications manager 820 may support wireless communication at a first wireless device in accordance with examples as disclosed herein. The capability indication component 825 may be configured as or otherwise support a means for receiving, prior to being RRC-connected with a second wireless device, a first message that indicates a first capability of the second wireless device to support full-duplex communications. The update indication component 830 may be configured as or otherwise support a means for receiving, after the first message and while the first wireless device and the second wireless device are RRC-connected, one or more second messages that indicates a second capability of the second wireless device to support the full-duplex communications, where the second capability is an update to the first capability. The full-duplex communications component 835 may be configured as or otherwise support a means for communicating with the second wireless device in accordance with the second capability indicated in a second message of the one or more second messages.

Figure 9:
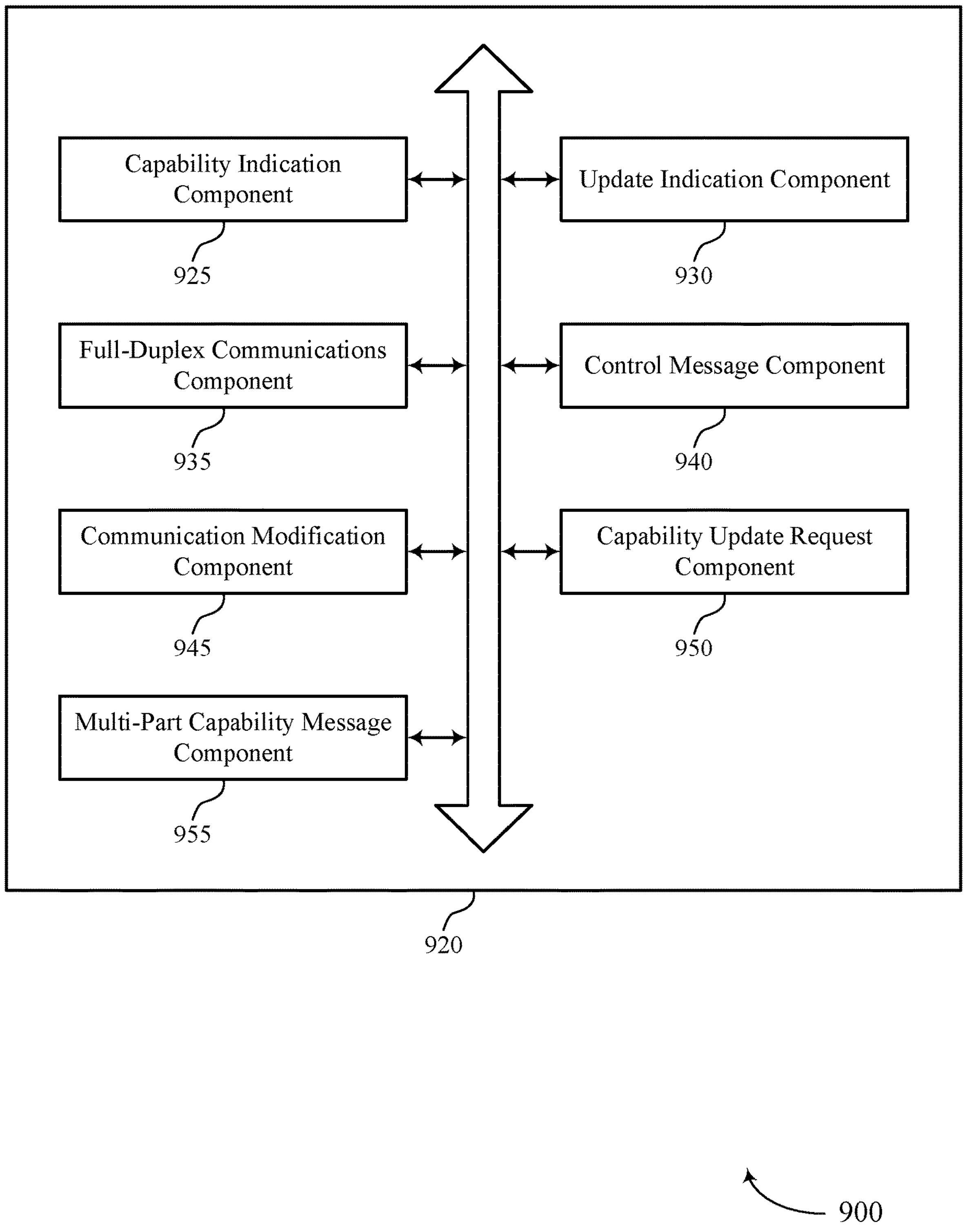
FIG. 9 illustrates a block diagram of a communications manager that supports multi-part dynamic capability signaling for full-duplex communications in accordance with one or more aspects of the present disclosure.

FIG. 9 illustrates a block diagram 900 of a communications manager 920 that supports multi-part dynamic capability signaling for full-duplex communications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multi-part dynamic capability signaling for full-duplex communications as described herein. For example, the communications manager 920 may include a capability indication component 925, an update indication component 930, a full-duplex communications component 935, a control message component 940, a communication modification component 945, a capability update request component 950, a multi-part capability message component 955, or any combination thereof. Each of these components may communicate, directly or indirectly, with one another (e.g., via one or more buses).

The communications manager 920 may support wireless communication at a first wireless device in accordance with examples as disclosed herein. The capability indication component 925 may be configured as or otherwise support a means for transmitting, prior to being RRC-connected with a second wireless device, a first message that indicates a first capability of the first wireless device to support full-duplex communications. The update indication component 930 may be configured as or otherwise support a means for transmitting, after the first message and while the first wireless device and the second wireless device are RRC-connected, one or more second messages that indicates a second capability of the first wireless device to support the full-duplex communications, where the second capability is an update to the first capability. The full-duplex communications component 935 may be configured as or otherwise support a means for communicating with the second wireless device in accordance with the second capability indicated in a second message of the one or more second messages.

In some aspects, the capability indication component 925 may be configured as or otherwise support a means for receiving a third message that indicates a third capability of the second network node to support the full-duplex communications. In some aspects, the update indication component 930 may be configured as or otherwise support a means for transmitting, after the third message and while the first network node and the second network node are RRC-connected, the second message that indicates the second capability of the first network node, where the second capability is based on the third capability.

In some aspects, to support transmitting the first message, the capability indication component 925 may be configured as or otherwise support a means for transmitting, via the first message, a fixed quantity of bits that indicates the first capability of the first wireless device.

In some aspects, the full-duplex communications component 935 may be configured as or otherwise support a means for communicate with the second network node in accordance with the first capability indicated in the first message. In some aspects, the control message component 940 may be configured as or otherwise support a means for transmitting a control message that indicates a power level of the first network node or a processing load of the first network node. In some aspects, the communication modification component 945 may be configured as or otherwise support a means for initiating a modification procedure or a tear-down procedure for the full-duplex communications based on the control message indicating that the power level of the first network node is less than a power level threshold or the processing load of the first network node is greater than a processing load threshold.

In some aspects, the second capability is a same as or is supplementary to the first capability of the first network node to support the full-duplex communications.

In some aspects, the second capability indicates that the first wireless device no longer supports the full-duplex communications.

In some aspects, the second message includes an indication of a set of full-duplex parameters associated with the first capability of the first network node to support the full-duplex communications.

In some aspects, the set of full-duplex parameters include one or more of a type of the first network node, one or more types of full-duplex communications modes supported by the first network node, a maximum power of the first network node in a full-duplex communications mode, one or more types of channels supported by the first network node in the full-duplex communications mode, a quantity of transmission layers per direction supported by the first network node in the full-duplex communications mode, a quantity of TCI states per direction supported by the first network node in the full-duplex communications mode, or a length of time for which the first capability and the set of full-duplex parameters are considered valid.

In some aspects, to support transmitting the second message, the update indication component 930 may be configured as or otherwise support a means for transmitting a quantity of bits that indicates the set of full-duplex parameters, where the quantity of bits is based on the second capability.

In some aspects, the update indication component 930 may be configured as or otherwise support a means for receiving the second message in response to successfully being RRC-connected with the second wireless device.

In some aspects, the capability update request component 950 may be configured as or otherwise support a means for receiving a request to update the first capability, where the second message is transmitted based on receiving the request.

In some aspects, the second message is transmitted prior to, during, or after an exchange of data with the second wireless device while the first wireless device and the second wireless device are RRC-connected.

In some aspects, the multi-part capability message component 955 may be configured as or otherwise support a means for transmitting, prior to being RRC-connected with the second wireless device, the first message indicating the first capability as a first part of a multi-part capability message. In some aspects, the multi-part capability message component 955 may be configured as or otherwise support a means for transmitting, after being RRC-connected with the second wireless device, the second message indicating the second capability as part of a second part of a multi-part capability message.

In some aspects, the first message is a broadcast message, a multicast message, a groupcast message, or a unicast message, and the second message is a groupcast message or a unicast message.

Additionally, or alternatively, the communications manager 920 may support wireless communication at a first wireless device in accordance with examples as disclosed herein. In some aspects, the capability indication component 925 may be configured as or otherwise support a means for receiving, prior to being RRC-connected with a second wireless device, a first message that indicates a first capability of the second wireless device to support full-duplex communications. In some aspects, the update indication component 930 may be configured as or otherwise support a means for receiving, after the first message and while the first wireless device and the second wireless device are RRC-connected, one or more second messages that indicates a second capability of the second wireless device to support the full-duplex communications, where the second capability is an update to the first capability. In some aspects, the full-duplex communications component 935 may be configured as or otherwise support a means for communicating with the second wireless device in accordance with the second capability indicated in a second message of the one or more second messages.

In some aspects, the capability indication component 925 may be configured as or otherwise support a means for transmitting a third message that indicates a third capability of the first network node to support the full-duplex communications. In some aspects, the update indication component 930 may be configured as or otherwise support a means for receiving, after the third message and while the first network node and the second network node are RRC-connected, the second message that indicates the second capability of the second network node, where the second capability is based on the third capability.

In some aspects, to support transmitting the first message, the capability indication component 925 may be configured as or otherwise support a means for receiving, via the first message, a fixed quantity of bits that indicates the first capability of the second wireless device.

In some aspects, the full-duplex communications component 935 may be configured as or otherwise support a means for communicate with the second network node in accordance with the first capability indicated in the first message. In some aspects, the control message component 940 may be configured as or otherwise support a means for receiving a control message that indicates a power level of the second network node or a processing load of the second network node. In some aspects, the communication modification component 945 may be configured as or otherwise support a means for performing a modification procedure or a tear-down procedure for the full-duplex communications based on the control message indicating that the power level of the second network node is less than a power level threshold or the processing load of the second network node is greater than a processing load threshold.

In some aspects, the second capability is a same as or is supplementary to the first capability of the second network node to support the full-duplex communications.

In some aspects, the second capability indicates that the second wireless device no longer supports the full-duplex communications.

In some aspects, the second message includes an indication of a set of full-duplex parameters associated with the first capability of the second network node to support the full-duplex communications.

In some aspects, the set of full-duplex parameters include one or more of a type of the first network node, one or more types of full-duplex communications modes supported by the first network node, a maximum power of the first network node in a full-duplex communications mode, one or more types of channels supported by the first network node in the full-duplex communications mode, a quantity of transmission layers per direction supported by the first network node in the full-duplex communications mode, a quantity of TCI states per direction supported by the first network node in the full-duplex communications mode, or a length of time for which the first capability and the set of full-duplex parameters are considered valid.

In some aspects, to support receiving the second message, the update indication component 930 may be configured as or otherwise support a means for receiving a quantity of bits that indicates the set of full-duplex parameters, where the quantity of bits is based on the second capability.

In some aspects, to support receiving the second message, the update indication component 930 may be configured as or otherwise support a means for receiving the second message in response to successfully being RRC-connected with the second wireless device.

In some aspects, the capability update request component 950 may be configured as or otherwise support a means for transmitting a request to update the first capability, where the second message is received based on transmitting the request.

In some aspects, the second message is received prior to, during, or after an exchange of data with the second wireless device while the first wireless device and the second wireless device are RRC-connected.

In some aspects, the multi-part capability message component 955 may be configured as or otherwise support a means for receiving, prior to being RRC-connected with the second wireless device, the first message indicating the first capability as a first part of a multi-part capability message. In some aspects, the multi-part capability message component 955 may be configured as or otherwise support a means for receiving, after being RRC-connected with the second wireless device, the second message indicating the second capability as part of a second part of a multi-part capability message.

In some aspects, the first message is a broadcast message, a multicast message, a groupcast message, or a unicast message, and the second message is a groupcast message or a unicast message.

Figure 10:
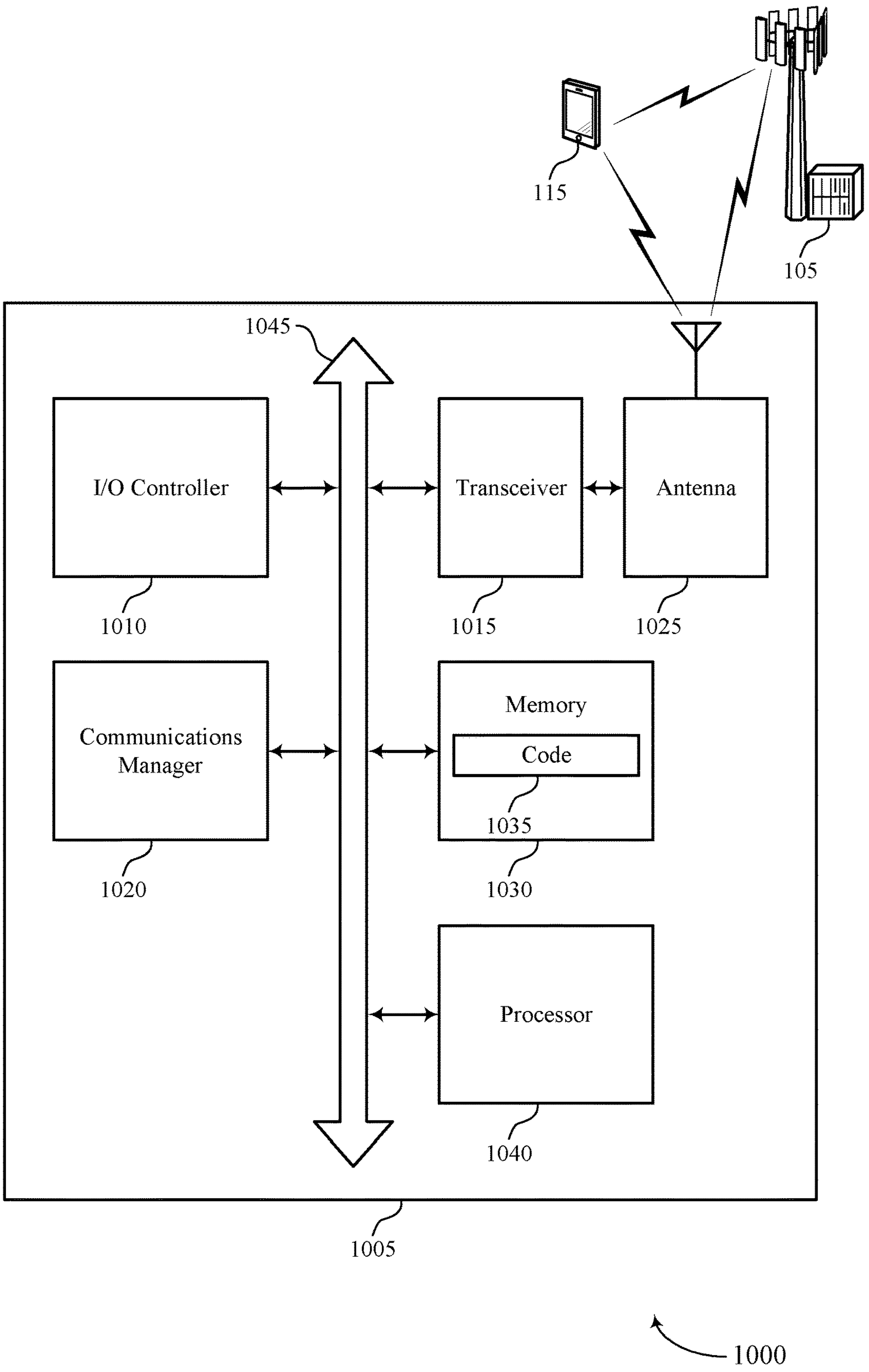
FIG. 10 illustrates a diagram of a system including a device that supports multi-part dynamic capability signaling for full-duplex communications in accordance with one or more aspects of the present disclosure.

FIG. 10 illustrates a diagram of a system 1000 including a device 1005 that supports multi-part dynamic capability signaling for full-duplex communications in accordance with one or more aspects of the present disclosure. The device 1005 may be an example of or include the components of a device 705, a device 805, or a network node as described herein. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another operating systems. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multi-part dynamic capability signaling for full-duplex communications). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first wireless device in accordance with examples as disclosed herein. For example, the communications manager 1020 may be configured as or otherwise support a means for transmitting, prior to being RRC-connected with a second wireless device, a first message that indicates a first capability of the first wireless device to support full-duplex communications. The communications manager 1020 may be configured as or otherwise support a means for transmitting, after the first message and while the first wireless device and the second wireless device are RRC-connected, one or more second messages that indicates a second capability of the first wireless device to support the full-duplex communications, where the second capability is an update to the first capability. The communications manager 1020 may be configured as or otherwise support a means for communicating with the second wireless device in accordance with the second capability indicated in a second message of the one or more second messages.

Additionally, or alternatively, the communications manager 1020 may support wireless communication at a first wireless device in accordance with examples as disclosed herein. For example, the communications manager 1020 may be configured as or otherwise support a means for receiving, prior to being RRC-connected with a second wireless device, a first message that indicates a first capability of the second wireless device to support full-duplex communications. The communications manager 1020 may be configured as or otherwise support a means for receiving, after the first message and while the first wireless device and the second wireless device are RRC-connected, one or more second messages that indicates a second capability of the second wireless device to support the full-duplex communications, where the second capability is an update to the first capability. The communications manager 1020 may be configured as or otherwise support a means for communicating with the second wireless device in accordance with the second capability indicated in a second message of the one or more second messages.

By including or configuring the communications manager 1020 in accordance with examples as described herein, the device 1005 may support techniques for a network node to use a multi-part capability message for improved communication reliability, reduced latency, improved user experience related to reduced processing, reduced power consumption, more efficient utilization of communication resources, improved coordination between devices, longer battery life, and improved utilization of processing capability.

In some aspects, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, In some aspects, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multi-part dynamic capability signaling for full-duplex communications as described herein, or the processor 1040 and the memory 1030 may be otherwise configured to perform or support such operations.

Figure 11:
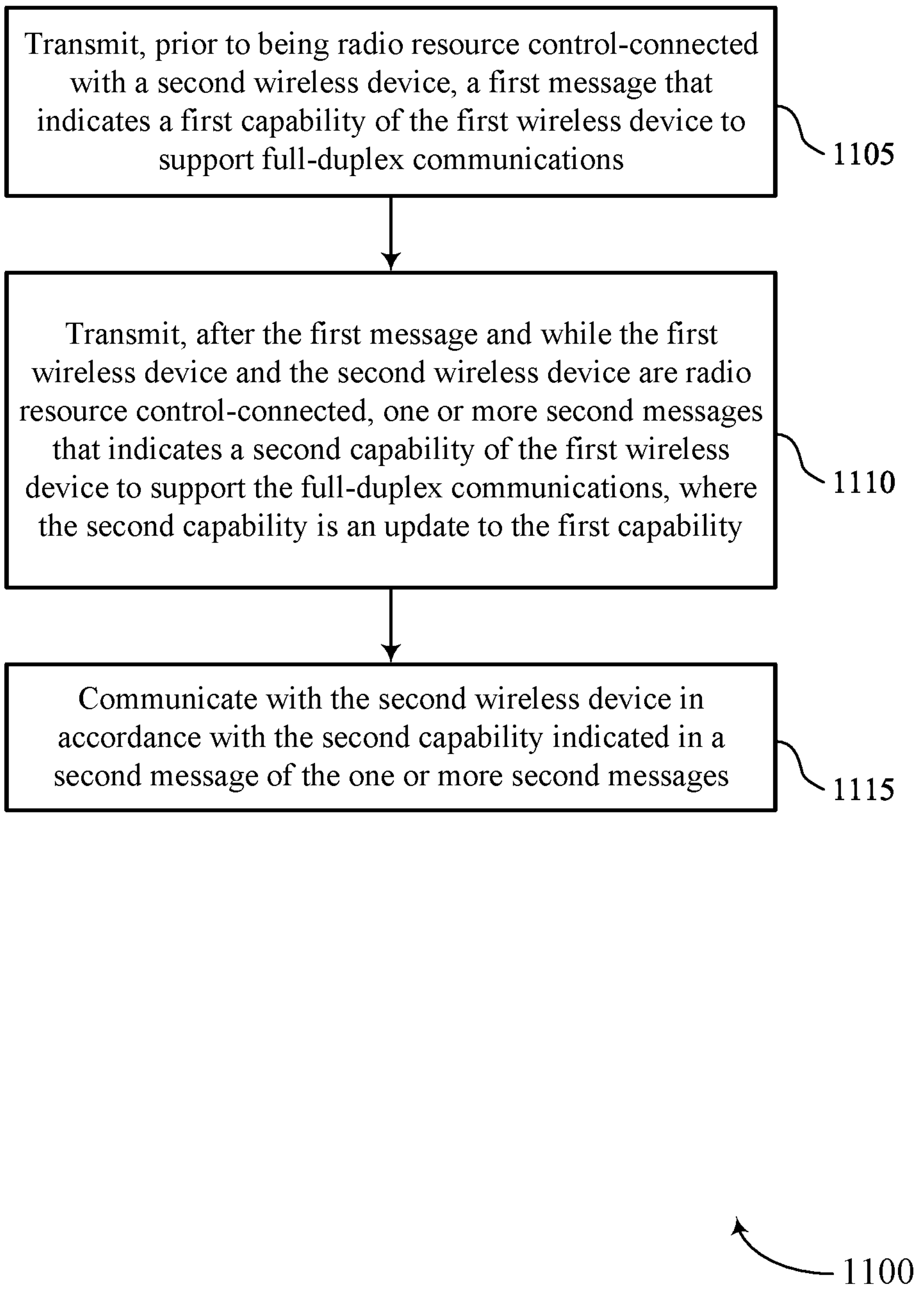
FIGS. 11 through 15 illustrate flowcharts showing methods that support multi-part dynamic capability signaling for full-duplex communications in accordance with one or more aspects of the present disclosure.

FIG. 11 illustrates a flowchart showing a method 1100 that supports multi-part dynamic capability signaling for full-duplex communications in accordance with one or more aspects of the present disclosure. The operations of the method 1100 may be implemented by a network node or its components as described herein. For example, the operations of the method 1100 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1105, the method may include transmitting, prior to being RRC-connected with a second wireless device, a first message that indicates a first capability of the first wireless device to support full-duplex communications. The operations of 1105 may be performed in accordance with examples as disclosed herein. In some aspects, aspects of the operations of 1105 may be performed by a capability indication component 925 as described with reference to FIG. 9.

At 1110, the method may include transmitting, after the first message and while the first wireless device and the second wireless device are RRC-connected, one or more second messages that indicates a second capability of the first wireless device to support the full-duplex communications, where the second capability is an update to the first capability. The operations of 1110 may be performed in accordance with examples as disclosed herein. In some aspects, aspects of the operations of 1110 may be performed by an update indication component 930 as described with reference to FIG. 9.

At 1115, the method may include communicating with the second wireless device in accordance with the second capability indicated in a second message of the one or more second messages. The operations of 1115 may be performed in accordance with examples as disclosed herein. In some aspects, aspects of the operations of 1115 may be performed by a full-duplex communications component 935 as described with reference to FIG. 9.

Figure 12:
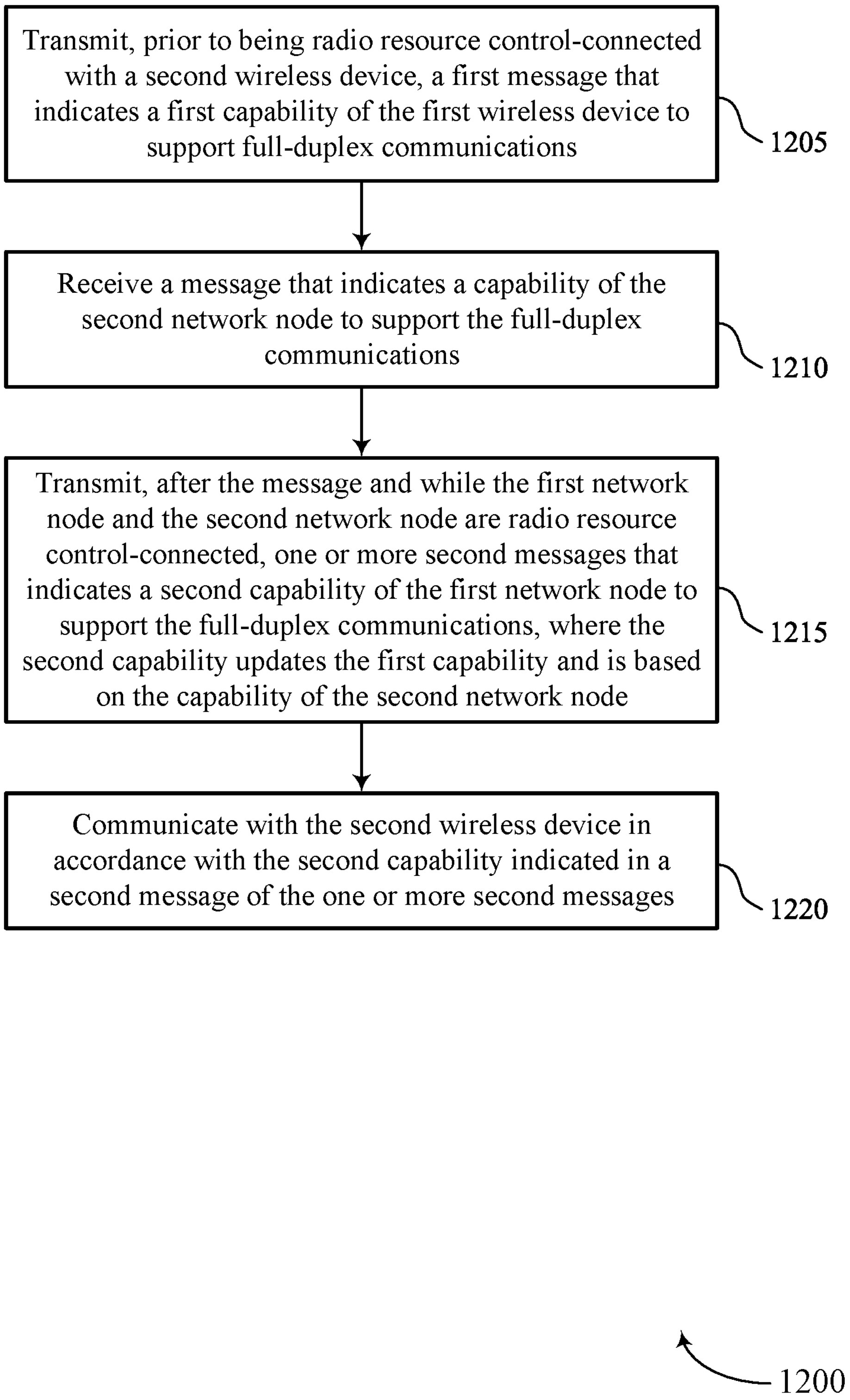

FIG. 12 illustrates a flowchart showing a method 1200 that supports multi-part dynamic capability signaling for full-duplex communications in accordance with one or more aspects of the present disclosure. The operations of the method 1200 may be implemented by a network node or its components as described herein. For example, the operations of the method 1200 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1205, the method may include transmitting, prior to being RRC-connected with a second wireless device, a first message that indicates a first capability of the first wireless device to support full-duplex communications. The operations of 1205 may be performed in accordance with examples as disclosed herein. In some aspects, aspects of the operations of 1205 may be performed by a capability indication component 925 as described with reference to FIG. 9.

At 1210, the method may include receiving a message that indicates a capability of the second network node to support the full-duplex communications. The operations of 1210 may be performed in accordance with examples as disclosed herein. In some aspects, aspects of the operations of 1210 may be performed by a capability indication component 925 as described with reference to FIG. 9.

At 1215, the method may include transmitting, after the message and while the first network node and the second network node are RRC-connected, one or more second messages that indicate a second capability of the first network node to support the full-duplex communications, where the second capability updates the first capability and is based on the capability of the second network node. The operations of 1215 may be performed in accordance with examples as disclosed herein. In some aspects, aspects of the operations of 1215 may be performed by an update indication component 930 as described with reference to FIG. 9.

RRC—At 1220, the method may include communicating with the second wireless device in accordance with the second capability indicated in a second message of the one or more second messages. The operations of 1220 may be performed in accordance with examples as disclosed herein. In some aspects, aspects of the operations of 1220 may be performed by a full-duplex communications component 935 as described with reference to FIG. 9.

Figure 13:
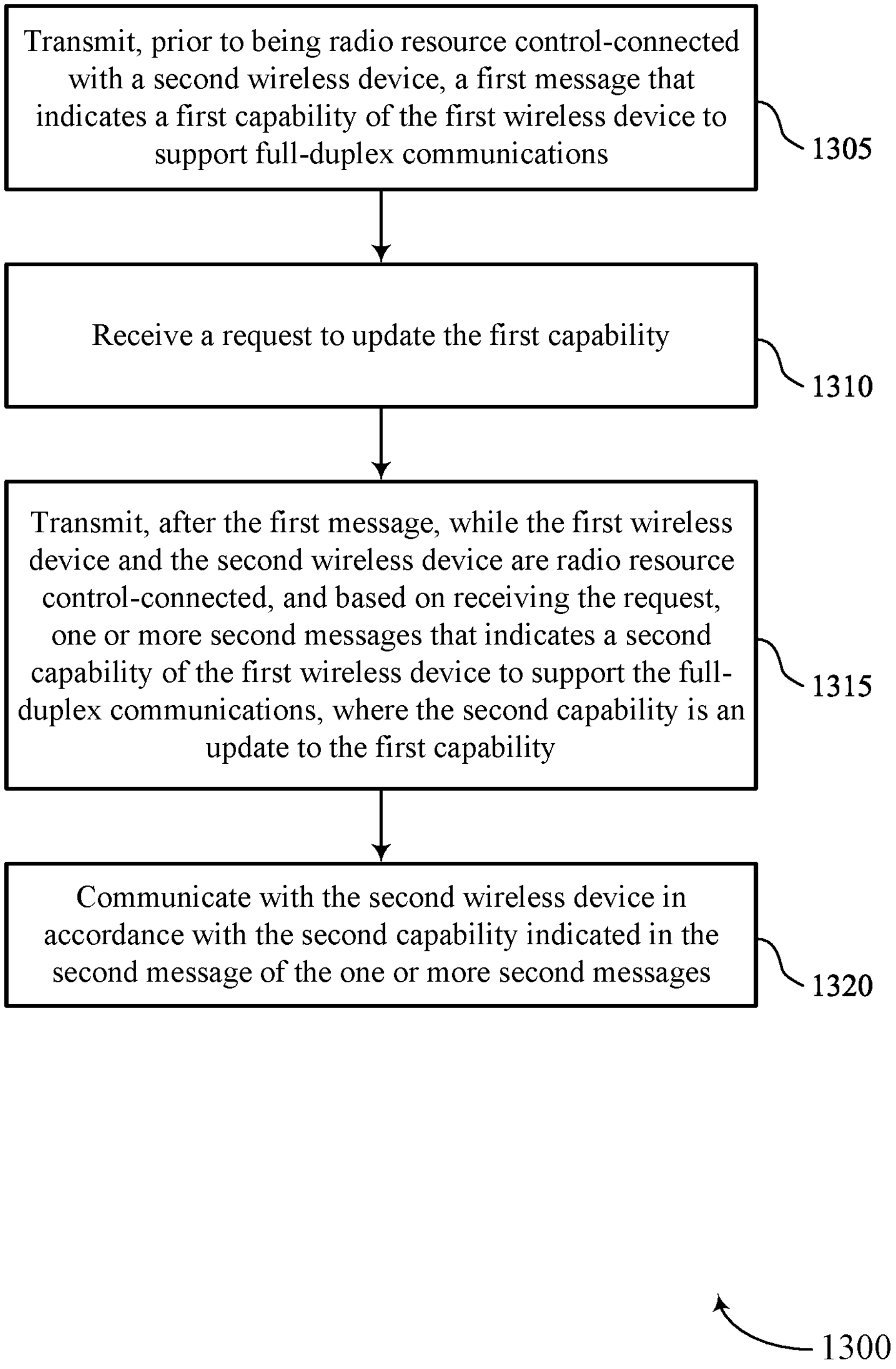

FIG. 13 illustrates a flowchart showing a method 1300 that supports multi-part dynamic capability signaling for full-duplex communications in accordance with one or more aspects of the present disclosure. The operations of the method 1300 may be implemented by a network node or its components as described herein. For example, the operations of the method 1300 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1305, the method may include transmitting, prior to being RRC-connected with a second wireless device, a first message that indicates a first capability of the first wireless device to support full-duplex communications. The operations of 1305 may be performed in accordance with examples as disclosed herein. In some aspects, aspects of the operations of 1305 may be performed by a capability indication component 925 as described with reference to FIG. 9.

At 1310, the method may include receiving a request to update the first capability. The operations of 1310 may be performed in accordance with examples as disclosed herein. In some aspects, aspects of the operations of 1310 may be performed by a capability update request component 950 as described with reference to FIG. 9.

At 1315, the method may include transmitting, after the first message, while the first wireless device and the second wireless device are RRC-connected, and based on receiving the request, one or more second messages that indicates a second capability of the first wireless device to support the full-duplex communications, where the second capability is an update to the first capability. The operations of 1315 may be performed in accordance with examples as disclosed herein. In some aspects, aspects of the operations of 1315 may be performed by an update indication component 930 as described with reference to FIG. 9.

At 1320, the method may include communicating with the second wireless device in accordance with the second capability indicated in the second message of the one or more second messages. The operations of 1320 may be performed in accordance with examples as disclosed herein. In some aspects, aspects of the operations of 1320 may be performed by a full-duplex communications component 935 as described with reference to FIG. 9.

Figure 14:
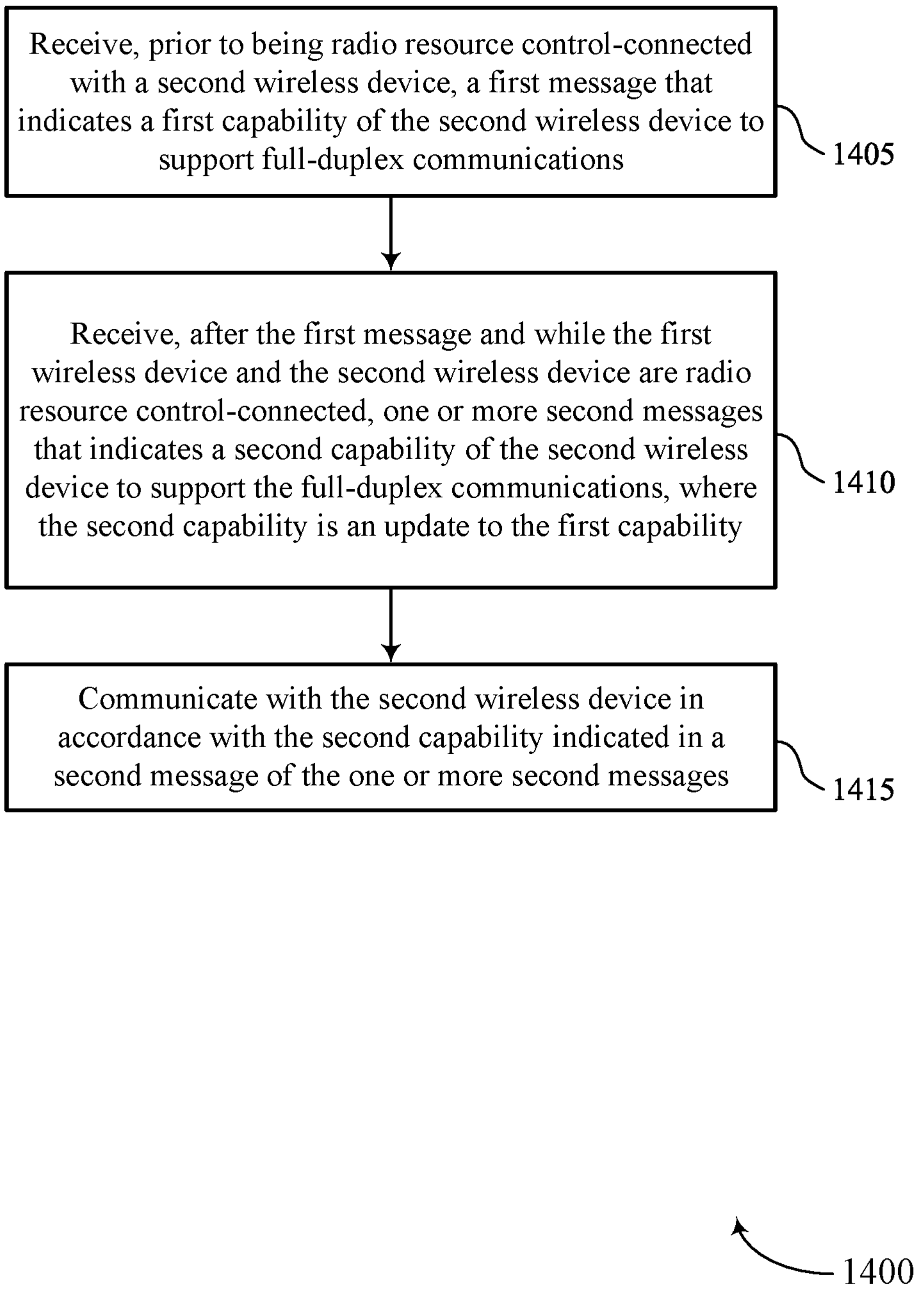

FIG. 14 illustrates a flowchart showing a method 1400 that supports multi-part dynamic capability signaling for full-duplex communications in accordance with one or more aspects of the present disclosure. The operations of the method 1400 may be implemented by a network node or its components as described herein. For example, the operations of the method 1400 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1405, the method may include receiving, prior to being RRC-connected with a second wireless device, a first message that indicates a first capability of the second wireless device to support full-duplex communications. The operations of 1405 may be performed in accordance with examples as disclosed herein. In some aspects, aspects of the operations of 1405 may be performed by a capability indication component 925 as described with reference to FIG. 9.

At 1410, the method may include receiving, after the first message and while the first wireless device and the second wireless device are RRC-connected, one or more second messages that indicates a second capability of the second wireless device to support the full-duplex communications, where the second capability is an update to the first capability. The operations of 1410 may be performed in accordance with examples as disclosed herein. In some aspects, aspects of the operations of 1410 may be performed by an update indication component 930 as described with reference to FIG. 9.

At 1415, the method may include communicating with the second wireless device in accordance with the second capability indicated in a second message of the one or more second messages. The operations of 1415 may be performed in accordance with examples as disclosed herein. In some aspects, aspects of the operations of 1415 may be performed by a full-duplex communications component 935 as described with reference to FIG. 9.

Figure 15:
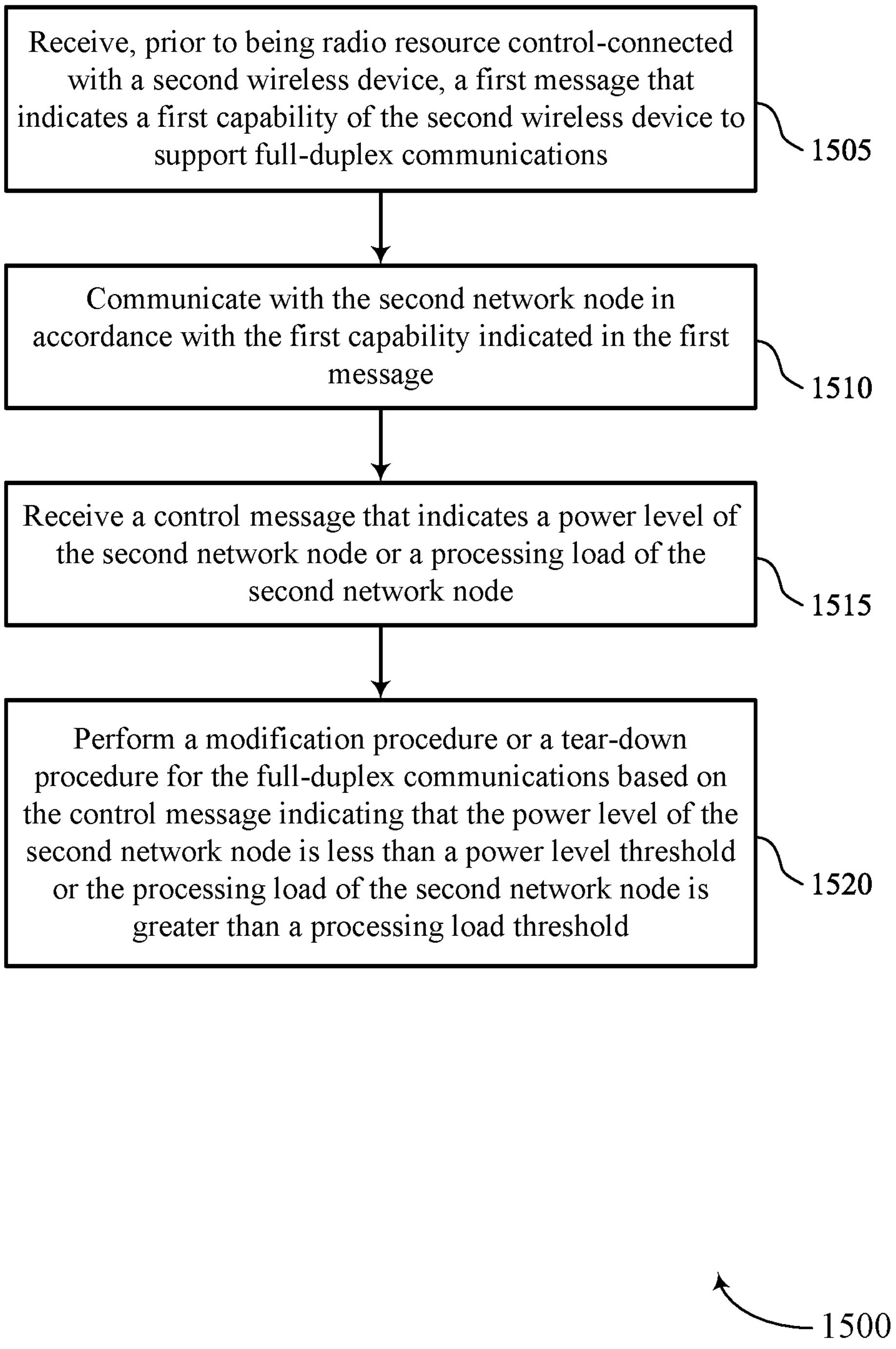

FIG. 15 illustrates a flowchart showing a method 1500 that supports multi-part dynamic capability signaling for full-duplex communications in accordance with one or more aspects of the present disclosure. The operations of the method 1500 may be implemented by a network node or its components as described herein. For example, the operations of the method 1500 may be performed by a network node as described with reference to FIGS. 1 through 10. In some examples, a network node may execute a set of instructions to control the functional elements of the network node to perform the described functions. Additionally, or alternatively, the network node may perform aspects of the described functions using special-purpose hardware.

At 1505, the method may include receiving, prior to being radio resource control-connected with a second wireless device, a first message that indicates a first capability of the second wireless device to support full-duplex communications. The operations of 1505 may be performed in accordance with examples as disclosed herein. In some examples, aspects of the operations of 1505 may be performed by a capability indication component 925 as described with reference to FIG. 9.

At 1510, the method may include communicate with the second network node in accordance with the first capability indicated in the first message. The operations of 1510 may be performed in accordance with examples as disclosed herein. In some examples, aspects of the operations of 1510 may be performed by a full-duplex communications component 935 as described with reference to FIG. 9.

At 1515, the method may include receiving a control message that indicates a power level of the second network node or a processing load of the second network node. The operations of 1515 may be performed in accordance with examples as disclosed herein. In some examples, aspects of the operations of 1515 may be performed by a control message component 940 as described with reference to FIG. 9.

At 1520, the method may include performing a modification procedure or a tear-down procedure for the full-duplex communications based on the control message indicating that the power level of the second network node is less than a power level threshold or the processing load of the second network node is greater than a processing load threshold. The operations of 1520 may be performed in accordance with examples as disclosed herein. In some examples, aspects of the operations of 1520 may be performed by a communication modification component 945 as described with reference to FIG. 9.

The following provides an overview of aspects of the present disclosure:

Aspect 1: A method for wireless communication at a first network node, comprising: transmitting, prior to being RRC-connected with a second network node, a first message that indicates a first capability of the first network node to support full-duplex communications; transmitting, after the first message and while the first network node and the second network node are RRC-connected, one or more second messages that indicates a second capability of the first network node to support the full-duplex communications, wherein the second capability is an update to the first capability; and communicating with the second network node in accordance with the second capability indicated in a second message of the one or more second messages.

Aspect 2: The method of aspect 1, further comprising: receiving a third message that indicates a third capability of the second network node to support the full-duplex communications; and transmitting, after the third message and while the first network node and the second network node are RRC-connected, the second message that indicates the second capability of the first network node, wherein the second capability is based on the third capability.

Aspect 3: The method of any of aspects 1 through 2, wherein transmitting the first message comprises: transmitting, via the first message, a fixed quantity of bits that indicates the first capability of the first network node.

Aspect 4: The method of aspect 1, further comprising: communicate with the second network node in accordance with the first capability indicated in the first message; transmitting a control message that indicates a power level of the first network node or a processing load of the first network node; and initiate a modification procedure or a tear-down procedure for the full-duplex communications based on the control message indicating that the power level of the first network node is less than a power level threshold or the processing load of the first network node is greater than a processing load threshold.

Aspect 5: The method of any of aspects 1 through 3, wherein the second capability is a same as or is supplementary to the first capability of the first network node to support the full-duplex communications.

Aspect 6: The method of any of aspects 1 through 3, wherein the second capability indicates that the first network node no longer supports the full-duplex communications.

Aspect 7: The method of any of aspects 1 through 6, wherein the second message includes an indication of a set of full-duplex parameters associated with the first capability of the first network node to support the full-duplex communications.

Aspect 8: The method of aspect 7, wherein the set of full-duplex parameters include one or more of a type of the first network node, one or more types of full-duplex communications modes supported by the first network node, a maximum power of the first network node in a full-duplex communications mode, one or more types of channels supported by the first network node in the full-duplex communications mode, a quantity of transmission layers per direction supported by the first network node in the full-duplex communications mode, a quantity of TCI states per direction supported by the first network node in the full-duplex communications mode, or a length of time for which the first capability and the set of full-duplex parameters are considered valid.

Aspect 9: The method of any of aspects 7 through 8, wherein transmitting the second message comprises: transmitting a quantity of bits that indicates the set of full-duplex parameters, wherein the quantity of bits is based on the second capability.

Aspect 10: The method of any of aspects 1 through 9, further comprising: receiving the second message in response to successfully being RRC-connected with the second network node.

Aspect 11: The method of any of aspects 1 through 10, further comprising: receiving a request to update the first capability, wherein the second message is transmitted based on receiving the request.

Aspect 12: The method of any of aspects 1 through 11, wherein the second message is transmitted prior to, during, or after an exchange of data with the second network node while the first network node and the second network node are RRC-connected.

Aspect 13: The method of any of aspects 1 through 12, further comprising: transmitting, prior to being RRC-connected with the second network node, the first message indicating the first capability as a first part of a multi-part capability message; and transmitting, after being RRC-connected with the second network node, the second message indicating the second capability as part of a second part of a multi-part capability message.

Aspect 14: The method of any of aspects 1 through 13, wherein the first message is a broadcast message, a multicast message, a groupcast message, or a unicast message, and wherein the second message is a groupcast message or a unicast message.

Aspect 15: A method for wireless communication at a first network node, comprising: receiving, prior to being RRC-connected with a second network node, a first message that indicates a first capability of the second network node to support full-duplex communications; receiving, after the first message and while the first network node and the second network node are RRC-connected, one or more second messages that indicates a second capability of the second network node to support the full-duplex communications, wherein the second capability is an update to the first capability; and communicating with the second network node in accordance with the second capability indicated in a second message of the one or more second messages.

Aspect 16: The method of aspect 15, further comprising: transmitting a third message that indicates a third capability of the first network node to support the full-duplex communications; and receiving, after the third message and while the first network node and the second network node are RRC-connected, the second message that indicates the second capability of the second network node, wherein the second capability is based on the third capability.

Aspect 17: The method of any of aspects 15 through 16, wherein transmitting the first message comprises: receiving, via the first message, a fixed quantity of bits that indicates the first capability of the second network node.

Aspect 18: The method of claim 14, further comprising: communicate with the second network node in accordance with the first capability indicated in the first message; receiving a control message that indicates a power level of the second network node or a processing load of the second network node; and perform a modification procedure or a tear-down procedure for the full-duplex communications based on the control message indicating that the power level of the second network node is less than a power level threshold or the processing load of the second network node is greater than a processing load threshold.

Aspect 19: The method of any of aspects 15 through 18, wherein the second capability is a same as or is supplementary to the first capability of the second network node to support the full-duplex communications.

Aspect 20: The method of any of aspects 15 through 19, wherein the second capability indicates that the second network node no longer supports the full-duplex communications.

Aspect 21: The method of any of aspects 15 through 20, wherein the second message includes an indication of a set of full-duplex parameters associated with the first capability of the second network node to support the full-duplex communications.

Aspect 22: The method of aspect 21, wherein the set of full-duplex parameters include one or more of a type of the first network node, one or more types of full-duplex communications modes supported by the first network node, a maximum power of the first network node in a full-duplex communications mode, one or more types of channels supported by the first network node in the full-duplex communications mode, a quantity of transmission layers per direction supported by the first network node in the full-duplex communications mode, a quantity of TCI states per direction supported by the first network node in the full-duplex communications mode, or a length of time for which the first capability and the set of full-duplex parameters are considered valid.

Aspect 23: The method of any of aspects 21 through 22, wherein receiving the second message comprises: receiving a quantity of bits that indicates the set of full-duplex parameters, wherein the quantity of bits is based on the second capability.

Aspect 24: The method of any of aspects 15 through 23, wherein receiving the second message comprises: receiving the second message in response to successfully being RRC-connected with the second network node.

Aspect 25: The method of any of aspects 15 through 24, further comprising: transmitting a request to update the first capability, wherein the second message is received based on transmitting the request.

Aspect 26: The method of any of aspects 15 through 25, wherein the second message is received prior to, during, or after an exchange of data with the second network node while the first network node and the second network node are RRC-connected.

Aspect 27: The method of any of aspects 15 through 26, further comprising: receiving, prior to being RRC-connected with the second network node, the first message indicating the first capability as a first part of a multi-part capability message; and receiving, after being RRC-connected with the second network node, the second message indicating the second capability as part of a second part of a multi-part capability message.

Aspect 28: The method of any of aspects 15 through 27, wherein the first message is a broadcast message, a multicast message, a groupcast message, or a unicast message, and wherein the second message is a groupcast message or a unicast message.

Aspect 29: An apparatus for wireless communication at a first network node, comprising a processor; memory coupled with the processor; and instructions stored in the memory and executable by the processor to cause the apparatus to perform a method of any of aspects 1 through 14.

Aspect 30: An apparatus for wireless communication at a first network node, comprising at least one means for performing a method of any of aspects 1 through 14.

Aspect 31: A non-transitory computer-readable medium storing code for wireless communication at a first network node, the code comprising instructions executable by a processor to perform a method of any of aspects 1 through 14.

Aspect 32: An apparatus for wireless communication at a first network node, comprising a processor; memory coupled with the processor; and instructions stored in the memory and executable by the processor to cause the apparatus to perform a method of any of aspects 15 through 28.

Aspect 33: An apparatus for wireless communication at a first network node, comprising at least one means for performing a method of any of aspects 15 through 28.

Aspect 34: A non-transitory computer-readable medium storing code for wireless communication at a first network node, the code comprising instructions executable by a processor to perform a method of any of aspects 15 through 28.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term “or” is an inclusive “or” unless limiting language is used relative to the alternatives listed. For example, reference to “X being based on A or B” shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of.".

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

a memory; and at least one processor coupled to the memory, wherein the at least one processor is configured to:

transmit, prior to being radio resource control-connected with a network node, a first message that indicates a first capability of the UE to support full-duplex sidelink communications with other UEs, wherein the first message is a first part of a multi-part capability message;

transmit, after the first message and while the UE and the network node are radio resource control-connected, one or more second messages that indicate a second capability of the UE to support the full-duplex sidelink communications with other UEs, wherein the second capability is an update to the first capability, and wherein the one or more second messages are a second part to the multi-part capability message; and communicate with the network node in accordance with the second capability indicated in a second message of the one or more second messages.

2. The UE of claim 1, wherein the at least one processor is configured to:

receive a third message that indicates a third capability of the network node to support the full-duplex sidelink communications; and transmit, after the third message and while the UE and the network node are radio resource control-connected, the second message that indicates the second capability of the UE, wherein the second capability is based on the third capability.

3. The UE of claim 1, wherein, to transmit the first message, the at least one processor is configured to:

transmit, via the first message, a fixed quantity of bits that indicates the first capability of the UE.

4. The UE of claim 1, wherein the at least one processor is configured to:

communicate with the network node in accordance with the first capability indicated in the first message;

transmit a control message that indicates a power level of the UE or a processing load of the UE; and initiate a modification procedure or a tear-down procedure for the full-duplex sidelink communications based on the control message indicating that the power level of the UE is less than a power level threshold or the processing load of the UE is greater than a processing load threshold.

5. The UE of claim 1, wherein the second capability is a same as or is supplementary to the first capability of the UE to support the full-duplex sidelink communications.

6. The UE of claim 1, wherein:

the first capability indicated by the first message indicates that the UE supports the full-duplex sidelink communications; and the second capability indicated by the one or more second messages indicates that the UE no longer supports the full-duplex sidelink communications.

7. The UE of claim 1, wherein the second message includes an indication of a set of full-duplex parameters associated with the first capability of the UE to support the full-duplex sidelink communications.

8. The UE of claim 7, wherein the set of full-duplex parameters include one or more of a type of the UE, one or more types of full-duplex communications modes supported by the UE, a maximum power of the UE in a full-duplex communications mode, one or more types of sidelink channels supported by the UE in the full-duplex communications mode, a quantity of transmission layers per direction supported by the UE in the full-duplex communications mode, a quantity of transmission configuration indicator states per direction supported by the UE in the full-duplex communications mode, or a length of time for which the first capability and the set of full-duplex parameters are considered valid.

9. The UE of claim 7, wherein, to transmit the second message, the at least one processor is configured to:
- transmit a quantity of bits that indicates the set of full-duplex parameters, wherein the quantity of bits is based on the second capability.

10. The UE of claim 1, wherein transmission of the second message is responsive to a successful radio resource control connection with the network node.

11. The UE of claim 1, wherein the at least one processor is configured to:
- receive a request to update the first capability, wherein the second message is transmitted based on receipt of the request.

12. The UE of claim 1, wherein the second message is transmitted prior to, during, or after an exchange of data with the network node while the UE and the network node are radio resource control-connected.

13. The UE of claim 1, wherein:
- the first message is a broadcast message, a multicast message, a groupcast message, or a unicast message, and
- the second message is a groupcast message or a unicast message.

14. A network node for wireless communication, comprising:
- a memory; and
- at least one processor coupled to the memory, wherein the at least one processor is configured to:
  - receive, prior to being radio resource control-connected with a user equipment (UE), a first message that indicates a first capability of the UE to support full-duplex sidelink communications with other UEs, wherein the first message is a first part of a multi-part capability message;
  - receive, after the first message and while the network node and the UE are radio resource control-connected, one or more second messages that indicate a second capability of the UE to support the full-duplex sidelink communications with other UEs, wherein the second capability is an update to the first capability, and wherein the one or more second messages are second part to the multi-part capability message; and
  - communicate with the UE in accordance with the second capability indicated in a second message of the one or more second messages.

15. The network node of claim 14, wherein the at least one processor is configured to:
- transmit a third message that indicates a third capability of the network node to support the full-duplex sidelink communications; and
- receive, after the third message and while the network node and the UE are radio resource control-connected, the second message that indicates the second capability of the UE, wherein the second capability is based on the third capability.

16. The network node of claim 14, wherein, to receive the first message, the at least one processor is configured to:
- receive, via the first message, a fixed quantity of bits that indicates the first capability of the UE.

17. The network node of claim 14, wherein the at least one processor is configured to:
- communicate with the UE in accordance with the first capability indicated in the first message;
- receive a control message that indicates a power level of the UE or a processing load of the UE; and
- perform a modification procedure or a tear-down procedure for the full-duplex sidelink communications based on the control message indicating that the power level of the UE is less than a power level threshold or the processing load of the UE is greater than a processing load threshold.

18. The network node of claim 14, wherein the second capability is a same as or is supplementary to the first capability of the UE to support the full-duplex sidelink communications.

19. The network node of claim 14, wherein:
- the first capability indicated by the first message indicates that the UE supports the full-duplex sidelink communications; and
- the second capability indicated by the one or more second messages indicates that the UE no longer supports the full-duplex sidelink communications.

20. The network node of claim 14, wherein the second message includes an indication of a set of full-duplex parameters associated with the first capability of the UE to support the full-duplex sidelink communications.

21. The network node of claim 20, wherein the set of full-duplex parameters include one or more of a type of the UE, one or more types of full-duplex communications modes supported by the UE, a maximum power of the UE in a full-duplex communications mode, one or more types of sidelink channels supported by UE in the full-duplex communications mode, a quantity of transmission layers per direction supported by the UE in the full-duplex communications mode, a quantity of transmission configuration indicator states per direction supported by the UE in the full-duplex communications mode, or a length of time for which the first capability and the set of full-duplex parameters are considered valid.

22. The network node of claim 20, wherein, to receive the second message, the at least one processor is configured to:
- receive a quantity of bits that indicates the set of full-duplex parameters, wherein the quantity of bits is based on the second capability.

23. The network node of claim 14, wherein reception of the second message is responsive to a successful radio resource control connection with the UE.

24. The network node of claim 14, wherein the at least one processor is configured to:
- transmit a request to update the first capability, wherein the second message is received based on transmission of the request.

25. The network node of claim 14, wherein the second message is received prior to, during, or after an exchange of data with the UE while the network node and the UE are radio resource control-connected.

26. The network node of claim 14, wherein:

the first message is a broadcast message, a multicast message, a groupcast message, or a unicast message, and the second message is a groupcast message or a unicast message.

27. A method of wireless communication performed by a user equipment (UE), comprising:

transmitting, prior to being radio resource control-connected with a wireless device, a first message that indicates a first capability of the UE to support full-duplex sidelink communications with other UEs, wherein the first message is a first part of a multi-part capability message;

transmitting, after the first message and while the UE and the wireless device are radio resource control-connected, one or more second messages that indicates a second capability of the UE to support the full-duplex sidelink communications with other UEs, wherein the second capability is an update to the first capability, and wherein the one or more second messages are a second part to the multi-part capability message; and communicating with the wireless device in accordance with the second capability indicated in a second message of the one or more second messages.

28. A method of wireless communication performed by a wireless device, comprising:

receiving, prior to being radio resource control-connected with a user equipment (UE), a first message that indicates a first capability of the UE to support full-duplex sidelink communications with other UEs, wherein the first message is a first part of a multi-part capability message;

receiving, after the first message and while the wireless device and the UE are radio resource control-connected, one or more second messages that indicates a second capability of the UE to support the full-duplex sidelink communications with other UEs, wherein the second capability is an update to the first capability, and wherein the one or more second messages are a second part to the multi-part capability message; and communicating with the UE in accordance with the second capability indicated in a second message of the one or more second messages.

* * * * *